US012694021B2

(12) United States Patent
Tong et al.

(10) Patent No.: US 12,694,021 B2
(45) Date of Patent: Jul. 28, 2026

(54) TECHNIQUES FOR GENERATING RESPONSES TO SEARCH QUERIES BY INTERACTING WITH MULTIPLE DOMAINS

(71) Applicant: Apple Inc., Cupertino, CA (US)

(72) Inventors: Jason K. Tong, San Francisco, CA (US); Kelly Shen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/903,419

(22) Filed: Oct. 1, 2024

(65) Prior Publication Data

US 2025/0165466 A1 May 22, 2025

Related U.S. Application Data

(60) Provisional application No. 63/602,081, filed on Nov. 22, 2023.

(51) Int. Cl.
*G06F 7/00* (2006.01)
*G06F 16/242* (2019.01)
(Continued)

(52) U.S. Cl.
CPC ...... *G06F 16/24522* (2019.01); *G06F 16/243* (2019.01); *G06F 16/248* (2019.01)

(58) Field of Classification Search
CPC .... G06F 16/243; G06F 16/244; G06F 16/245; G06F 16/248; G06F 16/332; G06F 16/93; G06F 16/285; G06F 16/9535; G06F 16/3329; G06F 16/90332; G06F 16/90335; G06F 16/217; G06F 16/2455; G06F 16/24522; G06F 16/2456; G06F 16/353; G06F 40/10; G06F 40/40; G06F 40/205;
(Continued)

(56) References Cited

U.S. PATENT DOCUMENTS 10,320,633 B1 * 6/2019 Wong .................... H04L 67/535
10,963,434 B1 * 3/2021 Rodriguez ............ G06F 16/212
(Continued)

OTHER PUBLICATIONS

International Patent Application No. PCT/US2024/050239; Int'l Search Report and the Written Opinion; dated Jan. 21, 2025; 14 pages.

*Primary Examiner* — Mohammad A Sana
(74) *Attorney, Agent, or Firm* — BAKERHOSTETLER; Kyle B. Morse

(57) ABSTRACT

Disclosed herein are techniques for managing search queries that require interactions with multiple domains. For example, a method implemented by a server computing device can include the steps of (1) receiving an unstructured query from a client computing device, (2) identifying one or more domains to which the unstructured query should be routed, (3) for each domain of the one or more domains: generating, based on (i) at least one respective model of the domain, and (ii) the unstructured query, a respective structured query, and providing the respective structured query to one or more knowledge sources to generate respective results, (4) aggregating the results to produce aggregated results, (5) filtering the aggregated results to produce filtered results, and (6) causing the client computing device to display at least a portion of the filtered results.

20 Claims, 14 Drawing Sheets

(51) Int. Cl.
G06F 16/2452 (2019.01)
G06F 16/248 (2019.01)

(58) Field of Classification Search
CPC .... G06F 40/105; G06F 40/106; G06F 40/186;
G06F 40/211
See application file for complete search history.

(56) References Cited

U.S. PATENT DOCUMENTS

| | | | | |
|---|---|---|---|---|
| 11,809,508 | B1 * | 11/2023 | Kallman | ............. G06F 16/9537 |
| 2013/0110519 | A1 | 5/2013 | Cheyer et al. | |
| 2015/0066479 | A1 | 3/2015 | Pasupalak et al. | |
| 2018/0341709 | A1 * | 11/2018 | Saklatvala | ........... G06F 16/245 |
| 2019/0163785 | A1 | 5/2019 | Ramachandra | |

* cited by examiner

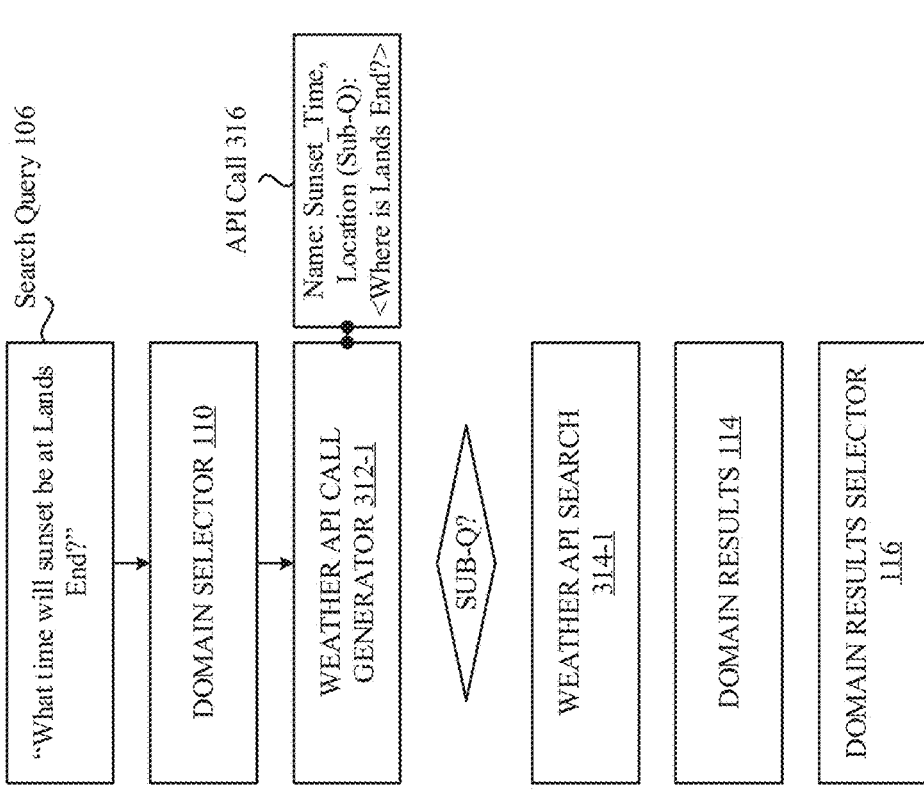
*FIG. 3A*

500

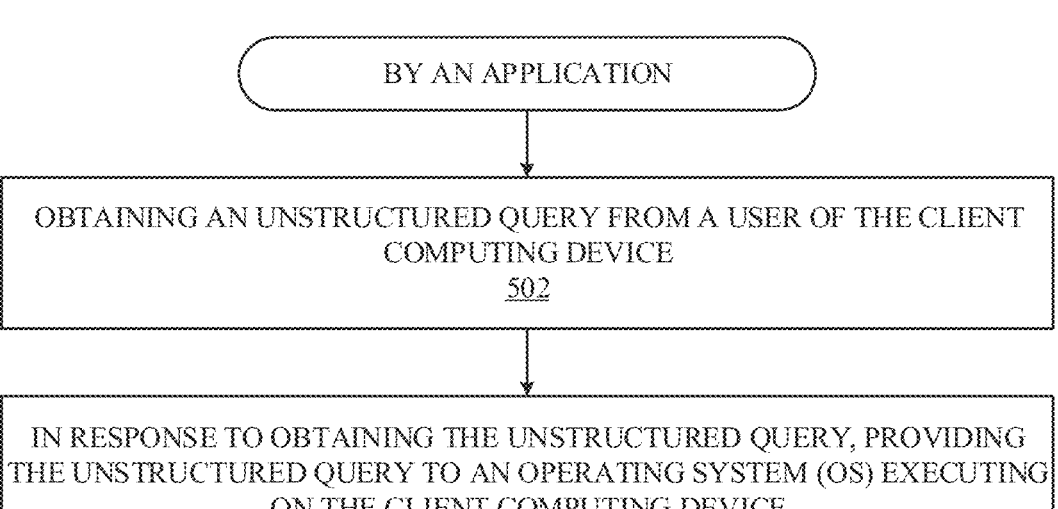

BY AN APPLICATION

OBTAINING AN UNSTRUCTURED QUERY FROM A USER OF THE CLIENT
COMPUTING DEVICE
502

IN RESPONSE TO OBTAINING THE UNSTRUCTURED QUERY, PROVIDING
THE UNSTRUCTURED QUERY TO AN OPERATING SYSTEM (OS) EXECUTING
ON THE CLIENT COMPUTING DEVICE
504

IN RESPONSE TO PROVIDING THE UNSTRUCTURED QUERY TO THE OS,
RECEIVING FILTERED RESULTS ASSOCIATED WITH THE UNSTRUCTURED
QUERY, WHERE:

(1) ONE OR MORE DOMAINS TO WHICH THE UNSTRUCTURED QUERY
SHOULD BE ROUTED ARE IDENTIFIED, (2) FOR EACH DOMAIN OF THE ONE OR MORE DOMAINS: A RESPECTIVE
STRUCTURED QUERY IS GENERATED BASED ON (I) AT LEAST ONE
RESPECTIVE MODEL OF THE DOMAIN, AND (II) THE UNSTRUCTURED
QUERY, AND THE RESPECTIVE STRUCTURED QUERY IS PROVIDED TO ONE
OR MORE KNOWLEDGE SOURCES TO GENERATE RESPECTIVE RESULTS,
AND (3) THE RESULTS ARE AGGREGATED AND FILTERED TO GENERATE THE
FILTERED RESULTS
506

IN RESPONSE TO RECEIVING THE FILTERED RESULTS, PERFORMING AT
LEAST ONE ACTION ASSOCIATED WITH THE FILTERED RESULTS
508

*FIG. 5*

TECHNIQUES FOR GENERATING RESPONSES TO SEARCH QUERIES BY INTERACTING WITH MULTIPLE DOMAINS

CROSS-REFERENCE TO RELATED APPLICATIONS

The present application claims the benefit of U.S. Provisional Application No. 63/602,081, entitled "TECHNIQUES FOR GENERATING RESPONSES TO SEARCH QUERIES BY INTERACTING WITH MULTIPLE DOMAINS," filed Nov. 22, 2023, the content of which is incorporated by reference herein in its entirety for all purposes.

FIELD

The described embodiments relate generally to implementing search algorithms. More particularly, the described embodiments provide techniques for generating responses to search queries by interacting with multiple domains.

BACKGROUND

Returning relevant search results to users based on their search queries can be a complex endeavor. In particular, returning relevant search results requires a sophisticated understanding of users' intent as well as efficiently accessing and utilizing the vast amount of information that is available (e.g., through local databases, knowledge graphs, the Internet, etc.). This can be difficult, however, for at least the following reasons.

First, the inherent ambiguity in search queries presents a significant challenge. In particular, users often express their informational needs in imprecise or vague terms, which can make it difficult for search engines to accurately interpret the users' intent. For example, a user searching for "java" could be looking for information about the island of Java in Indonesia, Java coffee, or the programming language Java®. Despite these challenges, deciphering users' intent remains an important aspect in providing relevant search results to them.

Second, the sheer volume of data that is accessible to search engines—such as through the Internet, through locally-accessible data sets, etc.—can be overwhelming. For example, search engines must crawl and index an immense number of web pages, and this vastness of information makes it challenging to ensure that all relevant data is considered when providing search results. Additionally, it is resource-intensive to keep these indexes up to date relative to the constantly-changing landscape of the Internet.

Third, language and cultural nuances often can add another layer of complexity. In particular, search engines must consider regional language variations, idiomatic expressions, and cultural differences to provide search results to users that are relevant and contextual to their locales. This can be problematic, however, as the meaning of a commonly used search term in one region could be entirely different in another, thereby leading to potential misinterpretations and inaccurate/irrelevant search results.

Additionally, personalization plays a crucial role in search results, but it also introduces challenges. In particular, a given search engine may aim to provide results that are tailored to a given user's individual preferences, search history, and so on. However, striking the right balance between personalization, diversity, and privacy considerations can be difficult. For example, a search engine that overemphasizes the user's search history may generate results that are highly specific to the user even when the user is only seeking a generic response to their inquiry. Conversely, a search engine that disregards the user's search history may generate search results that are highly generic to the user despite the user's desire to obtain more personalized search results.

In sum, the difficulty of returning relevant search results to users based on their search inputs arises from the ambiguity of search queries, the vastness of available information, language and cultural nuances, the complexities of personalization (while respecting privacy), and the ever-evolving nature of search engine algorithms. Addressing these challenges requires a combination of advanced technology, ongoing research, and a deep understanding of user behavior and intent in order to continually improve search experiences for users.

Accordingly, what is needed are improved techniques for providing relevant search results to users in response to their search queries.

SUMMARY

The described embodiments relate generally to implementing search algorithms. More particularly, the described embodiments provide techniques for generating responses to search queries by interacting with multiple domains.

One embodiment sets forth a method for managing search queries that require interactions with multiple domains. According to some embodiments, the method can be implemented by at least one server computing device, and includes the steps of (1) receiving an unstructured query from a client computing device, (2) identifying one or more domains to which the unstructured query should be routed, (3) for each domain of the one or more domains: generating, based on (i) at least one respective model of the domain, and (ii) the unstructured query, a respective structured query, and providing the respective structured query to one or more knowledge sources to generate respective results, (4) aggregating the results to produce aggregated results, (5) filtering the aggregated results to produce filtered results, and (6) causing the client computing device to display at least a portion of the filtered results.

According to some embodiments, at least one of the aforementioned structured queries can include one or more sub-questions that require respective answers to be obtained prior to generating the respective results for the at least one structured query. In this regard, the method can include the additional steps of, for each sub-question of the one or more sub-questions: (1) identifying one or more second domains to which the sub-question should be routed, (2) for each second domain of the one or more second domains: generating, based on (i) at least one respective model of the second domain, and (ii) the sub-question, a respective second structured query, and providing the respective second structured query to one or more knowledge sources to generate respective second results, (3) aggregating the second results to produce aggregated second results, (4) filtering the aggregated second results to produce filtered second results, and (5) answering the sub-question utilizing the filtered second results.

Another embodiment sets forth a method for an application to obtain query results based on search queries. According to some embodiments, the method can be implemented by an application executing on a client computing device, and includes the steps of (1) obtaining an unstructured query from a user of the client computing device, (2) in response to obtaining the unstructured query, providing the unstructured query to an operating system (OS) executing on the client computing device, (3) in response to providing the unstructured query to the OS, receiving filtered results associated with the unstructured query, where: (i) one or more domains to which the unstructured query should be routed are identified, (ii) for each domain of the one or more domains: a respective structured query is generated based on (a) at least one respective model of the domain, and (b) the unstructured query, and the respective structured query is provided to one or more knowledge sources to generate respective results, and (iii) the results are aggregated and filtered to generate the filtered results, and (4) in response to receiving the filtered results, performing at least one action associated with the filtered results.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 3A-3E illustrate sequential conceptual diagrams of how an example search query can be processed, according to some embodiments.

FIG. 5 illustrates a method for an application to obtain query results based on search queries, according to some embodiments.

DETAILED DESCRIPTION

Figure 1A:
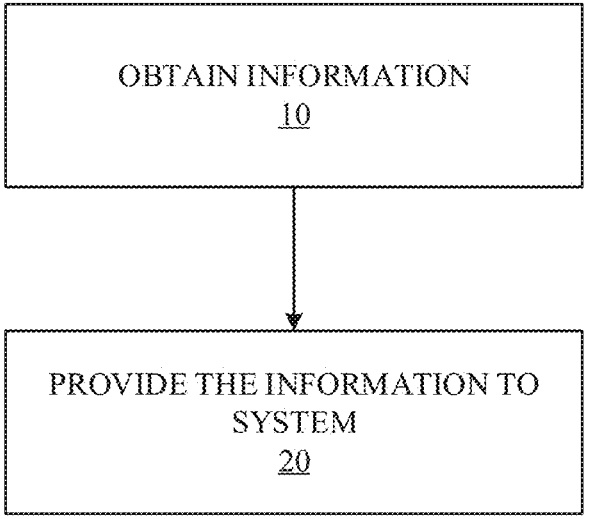
FIG. 1A illustrates an application process for interacting with a system.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes is referred to as generative content (e.g., generative images, generative graphics, generative video, generative audio, and/or generative text). Generative content is typically generated by an AI process based on a prompt that is provided to the AI process. An AI process typically uses one or more AI models to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content.

Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly, a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example, when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

The described embodiments relate generally to implementing search algorithms. More particularly, the described embodiments provide techniques for generating responses to search queries by interacting with multiple domains.

A current challenge in model-based approaches for providing responses to search queries involves determining the level of granularity by which the search queries should be broken down into sub-queries (also referred to herein as "sub-questions"). Consider, for example, the search query "Play the theme song of the latest James Bond movie." Using a coarse granularity approach, the search query may be broken down into the sub-question "What was the theme song of the last James Bond movie," instead of, for example, the sub-questions "What was the last James Bond movie" and "What was the theme song of <What was the last James Bond movie?>?". In this scenario, the search engine that receives the sub-question "What was the theme song of the last James Bond movie" may end up stalling if it cannot fully answer the compound question included therein (i.e., what was the last James Bond Movie, and what was the theme song of the movie).

In another example, consider the search query "Where can I get a lobster roll before the Red Sox game?". Using a fine(er) granularity approach, the search query may be broken down into the sub-questions (1) "Where is the Red Sox game?", and (2) "Lobster roll places near <location of Red Sox Game>." Notably, these sub-questions may not result in the aforementioned stall risks. However, the latter sub-question may be the only sub-question needed when the respective domain that handles the latter sub-question—such as a geospatial (i.e., mapping) engine—is (or later becomes) capable of fully answering the latter sub-question. In such a scenario, any work performed on the former sub-question would effectively be wasteful.

In yet another example, consider the search query "Take me to the Red Sox game." Under one approach, the search query may be broken down into the sub-questions (1) "Where is the Red Sox game?", and (2) "Directions to <location of Red Sox Game>." However, such a breakdown may be problematic, for example, when the user located is thousands of miles away from the Red Sox game location, and merely wanted to view a live video stream of the Red Sox game. In such a scenario, when the location context of the user is disregarded, any work performed on either sub-question would effectively be wasteful.

In view of the foregoing examples, it can be desirable to implement techniques for dynamically breaking down queries into sub-questions at an appropriate level of granularity that is based on, for example, the current capabilities of the domains that are selected to provide results for the sub-questions. It can also be desirable to implement techniques that incorporate relevant contextual information into the sub-questions, such as location information, locale information, user information (e.g., search history, preferences, etc.), and so on.

Notably, an "eager" planning approach—which involves pre-determining a full search plan—or an "iterative" planning approach—which prescribes the earliest dependency set first—both make early assumptions that may lead to stalls, dead-ends, etc., when the sub-questions are misinterpreted, the available domains cannot solve the sub-questions, and so on. Conversely, a progressive (i.e., not eager) and recursive (i.e., not iterative) approach can enable sub-questions to be broken down (e.g., into additional sub-questions) when needed, which can help mitigate potential stalling issues that might otherwise.

Accordingly, federated function-centric planning techniques can be utilized to identify additional sub-questions, and the domains to which sub-questions should be directed, to obtain information that can ultimately be aggregated to provide search results. In particular, under such techniques, per-domain planners can first ask what the domains would need to provide answers. In this regard, sub-questions are created by and for the domains that, given the answer to the sub-question, will be able to solve the parent problem. These techniques also provide the mechanism for creating sub-questions recursively in a purposeful way. They can also help avoid significant maintenance costs involved in updating planners whenever domains are introduced, updated, or removed. Beneficially, the federation of planning—as well as the function-centricity thereof—means that each planner can remain unaware of other tools' functions, which can promote domain-independent functionality and reduce flow complexities.

Implementations and techniques within the scope of the present disclosure can be partially or entirely realized using a tangible computer-readable storage medium (or multiple tangible computer-readable storage media of one or more types) encoding one or more computer-readable instructions. It should be recognized that computer-executable instructions can be organized in any format, including applications, application extensions, widgets, processes, software, software modules, and/or components.

Figure 1B:
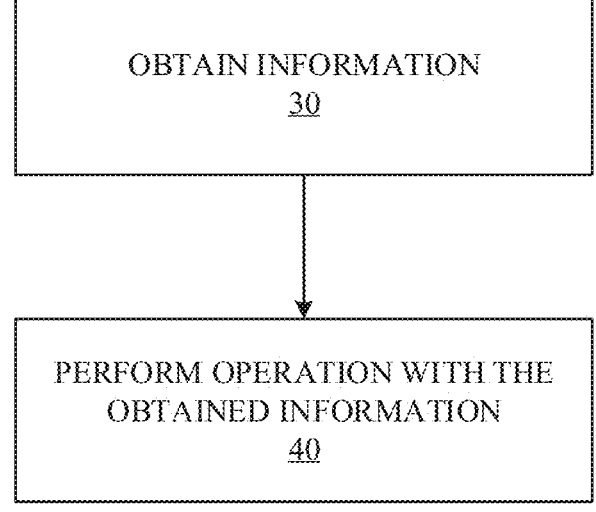
FIG. 1B illustrates an application process for interacting with a system.

Implementations within the scope of the present disclosure include a computer-readable storage medium that encodes instructions organized as an application (e.g., application 60) that, when executed by one or more processing units, control an electronic device (e.g., device 50) to perform the method of FIG. 1A, the method of FIG. 1B, and/or one or more other processes and/or methods described herein.

It should be recognized that application 60 (shown in FIG. 1D) can be any suitable type of application, including, for example, one or more of: a browser application, an application that functions as an execution environment for plug-ins, widgets or other applications, a search application, fitness application, a health application, a digital payments application, a media application, a social network application, a messaging application, and/or a maps application. In some embodiments, application 60 is an application that is pre-installed on device 50 at purchase (e.g., a first party application). In other embodiments, application 60 is an application that is provided to device 50 via an operating system update file (e.g., a first party application or a second party application). In other embodiments, application 60 is an application that is provided via an application store. In some embodiments, the application store can be an application store that is pre-installed on device 50 at purchase (e.g., a first party application store). In other embodiments, the application store is a third-party application store (e.g., an application store that is provided by another application store, downloaded via a network, and/or read from a storage device).

Figure 1C:
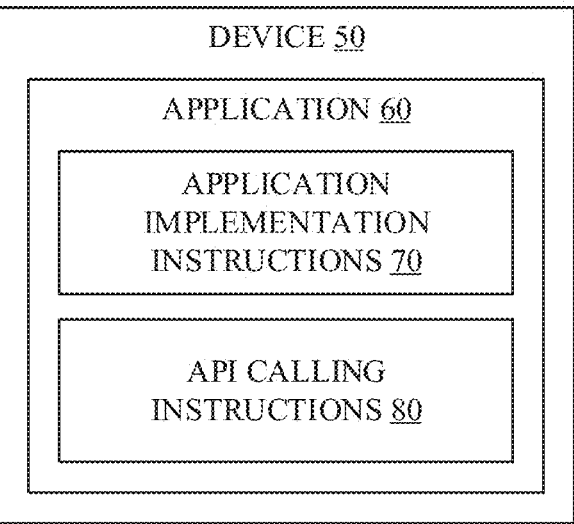
FIG. 1C illustrates software architecture of a device that includes Application Programming Interface (API) calling instructions.
Figure 1D:
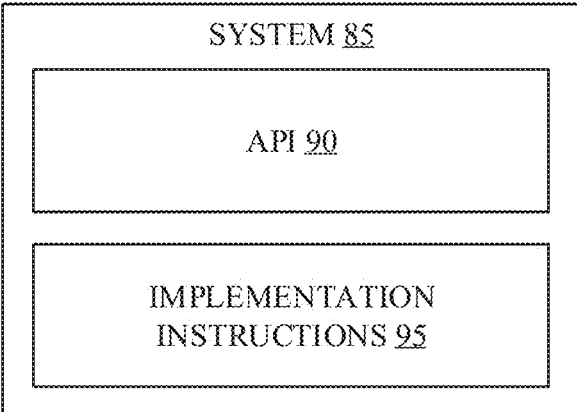
FIG. 1D illustrates software architecture of a system that includes an API and implementation instructions.
Figure 1E:
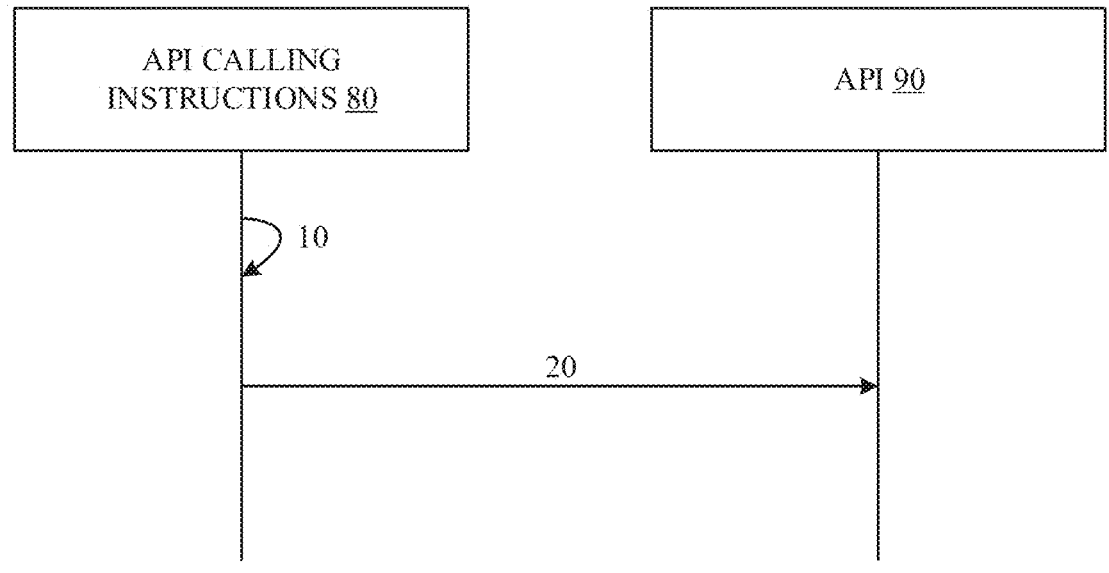
FIG. 1E illustrates an application process for interacting with a system using API calling instructions.

Referring to FIG. 1A and FIG. 1E, application 60 obtains information (e.g., step 10). In some embodiments, at step 10, information is obtained from at least one hardware component of the device 50. In some embodiments, at step 10, information is obtained from at least one software module (e.g., set of instructions) of the device 50. In some embodiments, at step 10, information is obtained from at least one hardware component external to the device 50 (e.g., a peripheral device, an accessory device, a server, etc.). In some embodiments, the information obtained at step 10 includes positional information, time information, notification information, user information, environment information, electronic device state information, weather information, media information, historical information, event information, hardware information, and/or motion information. In some embodiments, in response to and/or after obtaining the information at step 10, application 60 provides the information to a system (e.g., step 20).

In some embodiments, the system (e.g., 85 shown in FIG. 1D) is an operating system hosted on the device 50. In some embodiments, the system (e.g., 85 shown in FIG. 1D) is an external device (e.g., a server, a peripheral device, an accessory, a personal computing device, etc.) that includes an operating system.

Figure 1F:
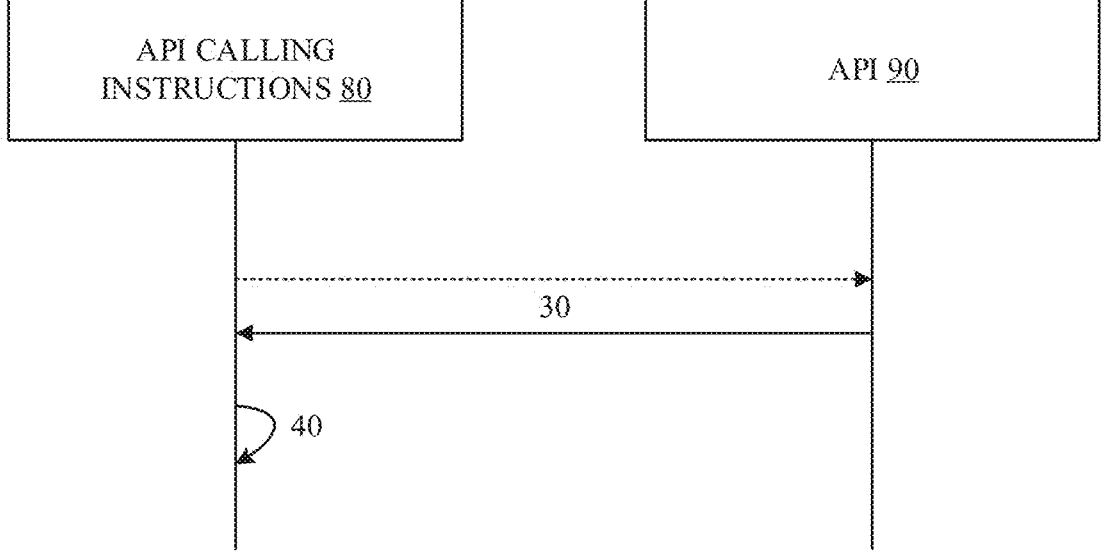
FIG. 1F illustrates an application process for interacting with a system using API calling instructions.

Referring to FIG. 1B and FIG. 1F, application 60 obtains information (e.g., step 30). In some embodiments, the information obtained at step 30 includes search information, positional information, time information, notification information, user information, environment information electronic device state information, weather information, media information, historical information, event information, hardware information and/or motion information. In response to and/or after obtaining the information at step 30, application 60 performs an operation with the information (e.g., step 40). In some embodiments, the operation performed at step

40 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 85 based on the information.

In some embodiments, one or more steps of the method of FIG. 1A and/or the method of FIG. 1B is performed in response to a trigger. In some embodiments, the trigger includes detection of an event, a notification received from system 85, a user input, and/or a response to a call to an API provided by system 85.

In some embodiments, the instructions of application 60, when executed, control device 50 to perform the method of FIG. 1A and/or the method of FIG. 1B by calling an application programming interface (API) (e.g., API 90) provided by system 85. In some embodiments, application 60 performs at least a portion of the method of FIG. 1A and/or the method of FIG. 1B without calling API 90.

In some embodiments, one or more steps of the method of FIG. 1A and/or the method of FIG. 1B includes calling an API (e.g., API 90) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 1C, device 50 is illustrated. In some embodiments, device 50 is a personal computing device, a smart phone, a smart watch, a fitness tracker, a head mounted display (HMD) device, a media device, a communal device, a speaker, a television, and/or a tablet. As illustrated in FIG. 1C, device 50 includes application 60 and an operating system (not shown). Application 60 includes application implementation instructions 70 and API calling instructions 80. System 85 includes API 90 and implementation instructions 95. It should be recognized that device 50, application 60, and/or system 85 can include more, fewer, and/or different components than illustrated in FIGS. 1C and 1D.

In some embodiments, application implementation instructions 70 is a software module that includes a set of one or more computer-executable instructions. In some embodiments, the set of one or more instructions of instructions 70 correspond to one or more operations performed by application 60. For example, when application 60 is a messaging application, application implementation instructions 70 can include operations to receive and send messages. In another example, when application 60 is a search application, application implementation instructions can include operations to process search requests, which includes generating responses that include relevant results for the search requests. In some embodiments, application implementation instructions 70 communicates with API calling instructions to communicate with system 85 via API 90 (shown in FIG. 1D).

In some embodiments, API-calling instructions 80 is a software module that includes a set of one or more computer-executable instructions.

In some embodiments, implementation instructions 95 is a software module that includes a set of one or more computer-executable instructions.

In some embodiments, API 90 is a software module that includes a set of one or more computer-executable instructions. In some embodiments, API 90 provides an interface that allows a different set of instructions (e.g., API calling instructions 80) to access and/or use one or more functions, methods, procedures, data structures, classes, and/or other services provided by implementation instructions 95 of system 85. For example, API-calling instructions 80 can access a feature of implementation instructions 95 through one or more API calls or invocations (e.g., embodied by a function or a method call) exposed by API 90 and can pass data and/or control information using one or more param- eters via the API calls or invocations. In some embodiments, API 90 allows application 60 to use a service provided by a Software Development Kit (SDK) library. In other embodi- ments, application 60 incorporates a call to a function or method provided by the SDK library and provided by API 90 or uses data types or objects defined in the SDK library and provided by API 90. In some embodiments, API-calling instructions 80 makes an API call via API 90 to access and use a feature of implementation instructions 95 that is specified by API 90. In such embodiments, implementation instructions 95 can return a value via API 90 to API-calling instructions 80 in response to the API call. The value can report to application 60 the capabilities or state of a hard- ware component of device 50, including those related to aspects such as input capabilities and state, output capabili- ties and state, processing capability, power state, storage capacity and state, and/or communications capability. In some embodiments, API 90 is implemented in part by firmware, microcode, or other low level logic that executes in part on the hardware component.

In some embodiments, API 90 allows a developer of API-calling instructions 80 (which can be a third-party developer) to leverage a feature provided by implementation instructions 95. In such embodiments, there can be one or more set of API-calling instructions (e.g., including API- calling instructions 80) that communicate with implemen- tation instructions 95. In some embodiments, API 90 allows multiple sets of API-calling instructions written in different programming languages to communicate with implementa- tion instructions 95 (e.g., API 90 can include features for translating calls and returns between implementation instructions 95 and API-calling instructions 80) while API 90 is implemented in terms of a specific programming language. In some embodiments, API-calling instructions 80 calls APIs from different providers such as a set of APIs from an OS provider, another set of APIs from a plug-in provider, and/or another set of APIs from another provider (e.g., the provider of a software library) or creator of the another set of APIs.

Examples of API 90 can include one or more of: a search API (e.g., for generating search results based on search queries), a pairing API (e.g., for establishing secure connec- tion, e.g., with an accessory), a device detection API (e.g., for locating nearby devices, e.g., media devices and/or smartphone), a payment API, a UIKit API (e.g., for gener- ating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodi- ments the sensor API is an API for accessing data associated with a sensor of device 50. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor and/or biometric sensor.

In some embodiments, implementation instructions 95 is a system (e.g., operating system, server system) software module (e.g., a collection of computer-readable instructions) that is constructed to perform an operation in response to receiving an API call via API 90. In some embodiments, implementation instructions 95 is constructed to provide an API response (via API 90) as a result of processing an API call. By way of example, implementation instructions 95 and API-calling instructions 80 can each be any one of an operating system, a library, a device driver, an API, an application program, or other module. It should be under- stood that implementation instructions 95 and API-calling instructions 80 can be the same or different type of software module from each other. In some embodiments, implemen- tation instructions 95 is embodied at least in part in firm- ware, microcode, or other hardware logic.

In some embodiments, implementation instructions 95 returns a value through API 90 in response to an API call from API-calling instructions 80. While API 90 defines the syntax and result of an API call (e.g., how to invoke the API call and what the API call does), API 90 might not reveal how implementation instructions 95 accomplishes the func- tion specified by the API call. Various API calls are trans- ferred via the one or more application programming inter- faces between API-calling instructions 80 and implementation instructions 95. Transferring the API calls can include issuing, initiating, invoking, calling, receiving, returning, and/or responding to the function calls or mes- sages. In other words, transferring can describe actions by either of API-calling instructions 80 or implementation instructions 95. In some embodiments, a function call or other invocation of API 90 sends and/or receives one or more parameters through a parameter list or other structure.

In some embodiments, implementation instructions 95 provides more than one API, each providing a different view of or with different aspects of functionality implemented by implementation instructions 95. For example, one API of implementation instructions 95 can provide a first set of functions and can be exposed to third party developers, and another API of implementation instructions 95 can be hidden (e.g., not exposed) and provide a subset of the first set of functions and also provide another set of functions, such as testing or debugging functions which are not in the first set of functions. In some embodiments, implementation instruc- tions 95 calls one or more other components via an under- lying API and thus be both a set of API calling instructions and a set of implementation instructions. It should be recognized that implementation instructions 95 can include additional functions, methods, classes, data structures, and/ or other features that are not specified through API 90 and are not available to API calling instructions 80. It should also be recognized that API calling instructions 80 can be on the same system as implementation instructions 95 or can be located remotely and access implementation instructions 95 using API 90 over a network. In some embodiments, imple- mentation instructions 95, API 90, and/or API-calling instructions 80 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

Figure 1G:
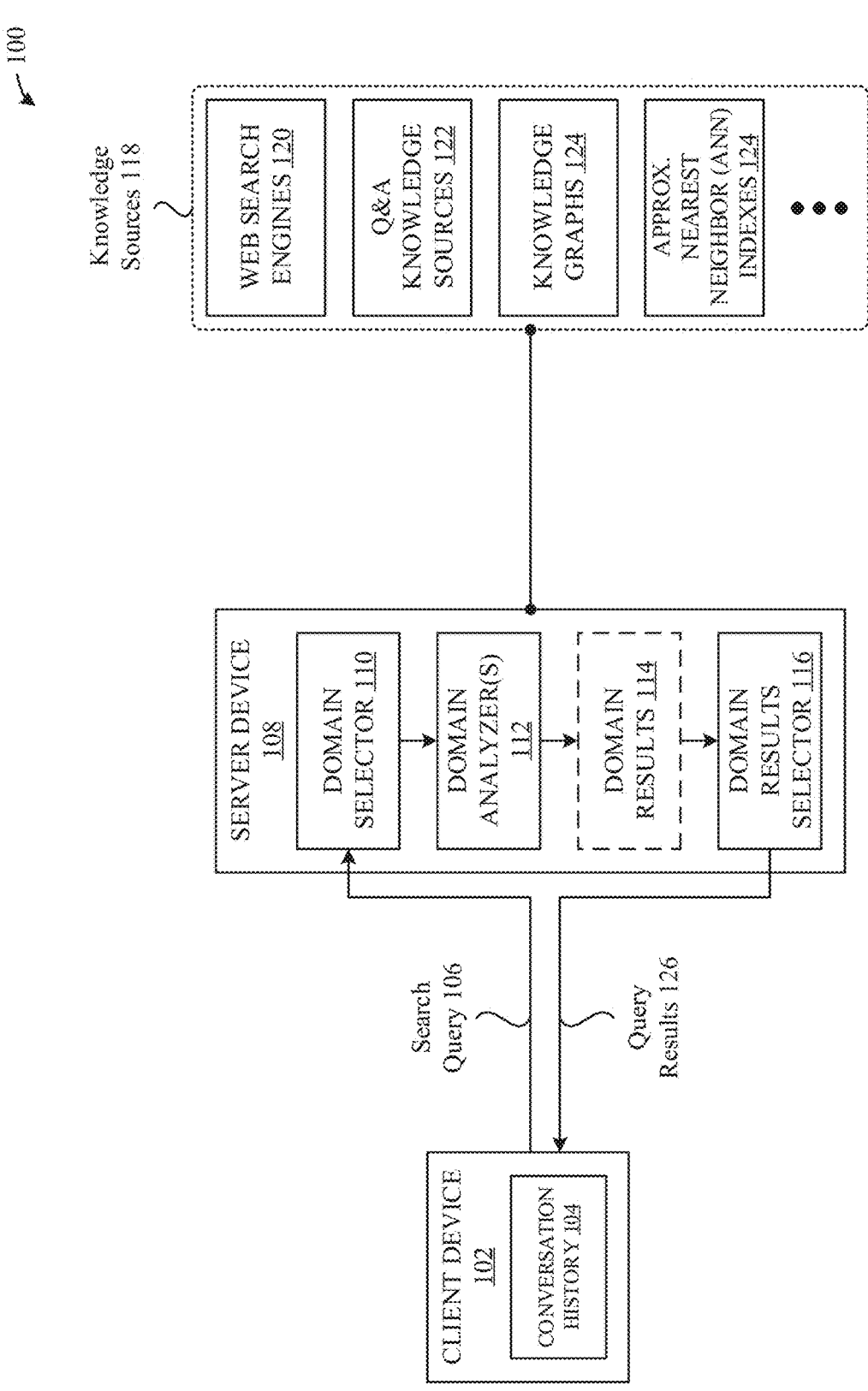
FIG. 1G illustrates a block diagram of different components of a system that can be configured to implement the various techniques described herein, according to some embodiments.

FIG. 1G illustrates a block diagram of different components of a system 100 that can be configured to implement the various techniques described herein, according to some embodiments. As shown in FIG. 1G, the system 100 can include a client computing device 102 and a server computing device 108. It is noted that, in the interest of simplifying this disclosure, the client computing device 102 and the server computing device 108 are discussed in singular capacities. In that regard, it should be appreciated that the system 100 can include any number of client computing devices 102 and server computing devices 108 without departing from the scope of this disclosure.

According to some embodiments, the client computing device 102 and the server computing device 108 can represent any form of computing device operated by an individual, an entity, etc., such as a wearable computing device, a smartphone computing device, a tablet computing device, a laptop computing device, a desktop computing device, a rack mount computing device, a gaming computing device, a smart home computing device, an Internet of Things (IOT) computing device, and so on. It is noted that the foregoing examples are not meant to be limiting, and that the client computing device 102/server computing device 108 can represent any type, form, etc., of computing device, without departing from the scope of this disclosure.

As shown in FIG. 1G, and as described in greater detail herein, the client computing device 102 can issue search queries 106 to a server computing device 108 (e.g., via the Internet, a network connection, etc.), where, in turn, the server computing device 108 can generate and provide query results 126 to the client computing device 102 (over the aforementioned connections, a different connection, etc.). Additionally, the client computing device 102 can store conversation history information 104, which can include information associated with the search queries 106, the query results 126, as well as any other type, form, etc., of information, at any level of granularity, pertaining to activity performed at the client computing device 102, the interactions between the client computing device 102 and the server computing device 108, and so on.

According to some embodiments, the conversation history information 104 can also represent/store other information associated with a user/the users of the client computing device 102, such as user account information, demographic-related information, device-related information (associated with the client computing device 102), and so on. It is noted that the conversation history information 104 can be stored locally on the client computing device 102, the server computing devices 108 (e.g., where appropriate authorization to do so has been provided), and/or any other computing devices, which can improve overall efficiency, enable synchronization functionalities, and so on. As described in greater detail herein, the conversation history information 104 can be utilized to improve the overall accuracy of the query results 126 that are generated and provided by the server computing device 108.

As shown in FIG. 1G, the server computing device 108 can include a domain selector 110, one or more domain analyzers 112, and a domain results selector 116 (collectively referred to herein as the "query processing pipeline"). The server computing device 108 can also be configured to interface with knowledge sources 118. According to some embodiments, the aforementioned entities can represent one or more artificial intelligence (AI) models—such as small language models (SLMs), large language models (LLMs), rule-based models, traditional machine learning models, custom models, ensemble models, knowledge graph models, hybrid models, domain-specific models, sparse models, transfer learning models, symbolic artificial intelligence (AI) models, generative adversarial network models, reinforcement learning models, biological models, and the like. It is noted that the foregoing examples are not meant to be limiting, and that any number, type, form, etc., of AI models, can be implemented by any of the entities illustrated in FIG. 1G, without departing from the scope of this disclosure. It is also noted that the aforementioned entities can represent non-AI-based entities, such as rules-based systems, knowledge-based systems, and so on.

According to some embodiments, the domain selector 110 can be configured to receive a search query 106 as an input, and to identify one or more domain analyzers 112, if any, that can potentially assist in generating query results 126 for the search query 106. In this regard, the domain selector 110 can be trained (e.g., using appropriate AI training approaches) to output, based on the search query 106, an indication of the one or more domain analyzers 112 to which the search query 106 should be directed. In turn, the search query 106 can be directed to the indicated one or more domain analyzers 112 so that they can begin processing the search query 106 in their respective fashions.

As a brief aside, it is noted that the server computing device 108 can be configured to implement a gating entity (not illustrated in FIG. 1G) that selectively directs search queries 106 to the query processing pipeline, instead of, for example, different, more rudimentary, etc., processing pipelines. In particular, the aforementioned gating entity can be adjusted to account for the speed, efficiency, etc., by which the various entities implemented by the server computing devices 108—as well as the knowledge sources 118—can effectively process search queries 106 and generate query results 126. The gating entity can also be adjusted to account for the current capabilities of the various entities implemented by the server computing devices 108, the knowledge sources 118, and so on. The gating entity can further be adjusted to account for the types of client computing devices 102, the users operating the client computing devices 102, etc., providing the search queries 106 to the server computing device 108. It is noted that the foregoing examples are not meant to be limiting, and that the aforementioned gating entity can be configured to selectively direct search queries 106 to the query processing pipeline based on any amount, type, form, etc., of information, at any level of granularity, without departing from the scope of this disclosure.

Turning back now to FIG. 1G, according to some embodiments, each domain analyzer 112 can implement a variety of processing entities that enable the domain analyzer 112 to generate respective domain results 114 that are based on the search query 106. In some cases, each domain analyzer 112 can recursively invoke additional query processing pipelines to acquire answers to sub-questions that the domain analyzer 112 is unable, unqualified, etc., to answer itself. According to some embodiments, and as previously stated herein, the domain analyzers 112 can also be configured to interface with knowledge sources 118 to generate the domain results 114. A more detailed breakdown of the functionality of the domain analyzer 112 is described below in conjunction with FIGS. 2 and 3A-3E.

According to some embodiments, and as shown in FIG. 1G, the knowledge sources 118 can include, for example, web search engines 120, question and answer (Q&A) knowledge sources 122, knowledge graphs 124, approximate nearest-neighbor (ANN) indexes 126, and so on. It is noted that the knowledge sources 118 illustrated in FIG. 1G and described herein are not meant to be limiting, and that the domain analyzer 112 (as well as the other entities described herein) can be configured to access any type, kind, form, etc., of knowledge source 118 that is capable of receiving queries and providing responses, without departing from the scope of this disclosure. It should also be understood that the knowledge sources 118 can employ any number, type, form, etc., of AI models (or non-AI based approaches) to provide the various functionalities described herein, without departing from the scope of this disclosure. It should also be understood that the knowledge sources 118 can be implemented by any computing entity (e.g., the client computing device 102, the server computing device 108, etc.), service (e.g., cloud services), etc., without departing from the scope of this disclosure.

According to some embodiments, the web search engines 120 can represent web search entities that are capable of receiving queries and providing answers based on what is accessible via the Internet. To implement this functionality, the web search engines 120 can "crawl" the Internet, which involves identifying, parsing, and indexing the content of web pages, such that relevant content can be efficiently identified in response to search queries that are received. According to some embodiments, the Q&A knowledge sources 122 can represent systems, databases, etc., that can formulate answers to questions that are commonly received. To implement this functionality, the Q&A knowledge sources 122 typically rely on structured or semi-structured knowledge bases that contain a wide range of information, facts, data, or textual content that is manually curated, generated from text corpora, or collected from various sources, such as books, articles, databases, or the Internet.

According to some embodiments, the knowledge graphs 124 can represent systems, databases, etc., that can be accessed to formulate answers to queries that are received. A given knowledge graph 124 typically constitutes a structured representation of knowledge that captures relationships and connections between entities, concepts, data points, etc. in a way that computing devices are capable of understanding. According to some embodiments, the ANN indexes 124 can represent systems, databases, etc., that can be accessed to formulate answers to queries that are received. A given ANN index 124 typically constitutes a data structure that is arranged in a manner that enables similarity searches and retrievals in high-dimensional spaces to be efficiently performed. This makes the ANN indexes 124 particularly useful when performing tasks that involve information retrieval, recommendations, and finding similar data points, objects, and so on.

In any case, the domain results 114 can be provided to the domain results selector 116. According to some embodiments, the domain results selector 116 can be configured to identify, among the domain results 114, the domain results 114 that are most relevant to the search query 106, the context(s) under which the search query 106 was generated, and so on. According to some embodiments, the domain results selector 116 can further-process the domain results 114 based on any amount, type, form, etc., of information, at any level of granularity, to generate the query results 126. For example, the domain results selector 116 can implement any number, type, form, etc., of AI models to filter redundant, inaccurate, irrelevant, etc., results included in a given set of domain results 114. The domain results selector 116 can also be configured to identify and eliminate any domain results 114 that are considered to be "AI hallucinations," which refer to the generation of false or distorted perceptions, ideas, or sensations by AI systems. This phenomenon can occur when AI models, such as LLMs, generate outputs that are not based on real data but instead originate from patterns or noise present in their training data or model architecture. Such hallucinations can manifest as incorrect information, fantastical scenarios, nonsensical sentences, or a blend of real and fabricated content.

To implement the foregoing functionalities, the domain results selector 116 can analyze any information—such as the search query 106, the structured queries, the sub-questions, the domain results 114, the conversation history information 104 (associated with the client computing device 102 that issued the search query 106), and/or any other information—to remove redundant, inaccurate, irrelevant, hallucinatory, etc. results, if any, from the search results. According to some embodiments, the domain results selector 116 can also interface with a content database (not illustrated in FIG. 1G)—which, for example, can store, manage, etc., digital assets—to identify whether any digital assets referenced in the domain results 114 are accessible via the content database. This step can be beneficial in that any digital assets that are identified—but are not accessible via the content database—can optionally be culled from the search results, deprioritized within the search results, the like.

Additionally, and according to some embodiments, the domain results selector 116 can be configured to implement an explanation agent (not illustrated in FIG. 1G). According to some embodiments, the explanation agent can be configured to implement any number, type, form, etc., of AI models to provide explanations for one or more of the query results 126. To implement this functionality, the explanation agent can analyze any information, such as the search query 106, the structured queries, the sub-questions, the domain results 114, the conversation history information 104 (associated with the client computing device 102 that issued the search query 106), and/or any other information. In one example, the explanation for a given query result 126 can include a breakdown of why the query result 126 is relevant, a breakdown of how the query result 126 was identified, a breakdown of where the query result 126 was located, and so on. It is noted that the foregoing examples are not meant to be limiting, and that the explanations can include any amount, type, form, etc., of information, at any level of granularity, without departing from the scope of this disclosure.

Additionally, it is noted that, under some configurations, the explanation agent can also be configured to provide explanations for query results 126 that were filtered out by the domain results selector 116. In turn, such explanations can be utilized in any manner to improve the manner in which the system 100 generates search results. For example, the explanations can be used to improve the intelligence of the various AI models discussed herein, to demonstrate to end-users that time is being saved by intelligently eliminating certain results for good/explainable reasons, and so on.

Additionally, and according to some embodiments, the domain results selector 116 can be configured to implement a content agent (not illustrated in FIG. 1G). According to some embodiments, the content agent can be configured to implement any number, type, form, etc., of AI models to generate content that is relevant to the query results 126. For example, the content agent can implement generative adversarial networks (GANs), variational autoencoders (VAEs), recurrent neural networks (RNNs), convolutional neural networks (CNNs), neuroevolution systems, deep dream systems, style transfer systems, rule-based systems, interactive evolutionary algorithms, and so on. Such content can include, for example, digital content that corresponds to the query results 126 (e.g., text content, image content, audio content, video content, etc.). It is noted that the foregoing examples are not meant to be limiting, and that the content agent can generate any amount, type, form, etc., of digital content, at any level of granularity, without departing from the scope of this disclosure. For example, the content can include audio content, video content, document content, web content (e.g., hypertext markup language (HTML) content), programming language content, and so on.

According to some embodiments, the query results 126 can be organized using any approach that is feasible for sending the aforementioned assets to the client computing device 102 in a manner that is understood by the client computing device 102. In turn, the client computing device 102 can display the query results 126 using the appropriate applications, user interfaces, etc., to enable a user of the client computing device 102 to interact with the aforementioned assets. A more detailed explanation of how the client computing device 102 can enable its user to interact with the aforementioned assets is provided below in conjunction with FIGS. 2 and 3A-3E.

It is noted that the logical breakdown of the entities illustrated in FIG. 1G—as well as the logical flow of the manner in which such entities communicate—should not be construed as limiting. On the contrary, any of the entities illustrated in FIG. 1G can be separated into additional entities within the system 100, combined together within the system 100, or removed from the system 100, without departing from the scope of this disclosure. It is additionally noted that, in the interest of unifying and simplifying this disclosure, the described embodiments primarily pertain to mapping-based search queries 106 and query results 126. However, it should be appreciated that the embodiments disclosed herein can be implemented to access any form of digital content, such as movies, television shows, books, documents, web pages, and so on. It is noted that the foregoing examples are not meant to be limiting, and that any amount, type, form, etc., of digital content can be accessed using the same or similar techniques to those described herein, without departing from the scope of this disclosure.

Additionally, it should be understood that the various components of the computing devices illustrated in FIG. 1G are presented at a high level in the interest of simplification. For example, although not illustrated in FIG. 1G, it should be appreciated that the various computing devices can include common hardware/software components that enable the above-described software entities to be implemented. For example, each of the computing devices can include one or more processors that, in conjunction with one or more volatile memories (e.g., a dynamic random-access memory (DRAM)) and one or more storage devices (e.g., hard drives, solid-state drives (SSDs), etc.), enable the various software entities described herein to be executed. Moreover, each of the computing devices can include communications components that enable the computing devices to transmit information between one another.

A more detailed explanation of these hardware components is provided below in conjunction with FIG. 6. It should additionally be understood that the computing devices can include additional entities that enable the implementation of the various techniques described herein without departing from the scope of this disclosure. It should additionally be understood that the entities described herein can be combined or split into additional entities without departing from the scope of this disclosure. It should further be understood that the various entities described herein can be implemented using software-based or hardware-based approaches without departing from the scope of this disclosure.

Accordingly, FIG. 1G provides an overview of the manner in which the system 100 can implement the various techniques described herein, according to some embodiments. A more detailed breakdown of the manner in which these techniques can be implemented will now be provided below in conjunction with FIGS. 2 and 3A-3E.

Figure 2:
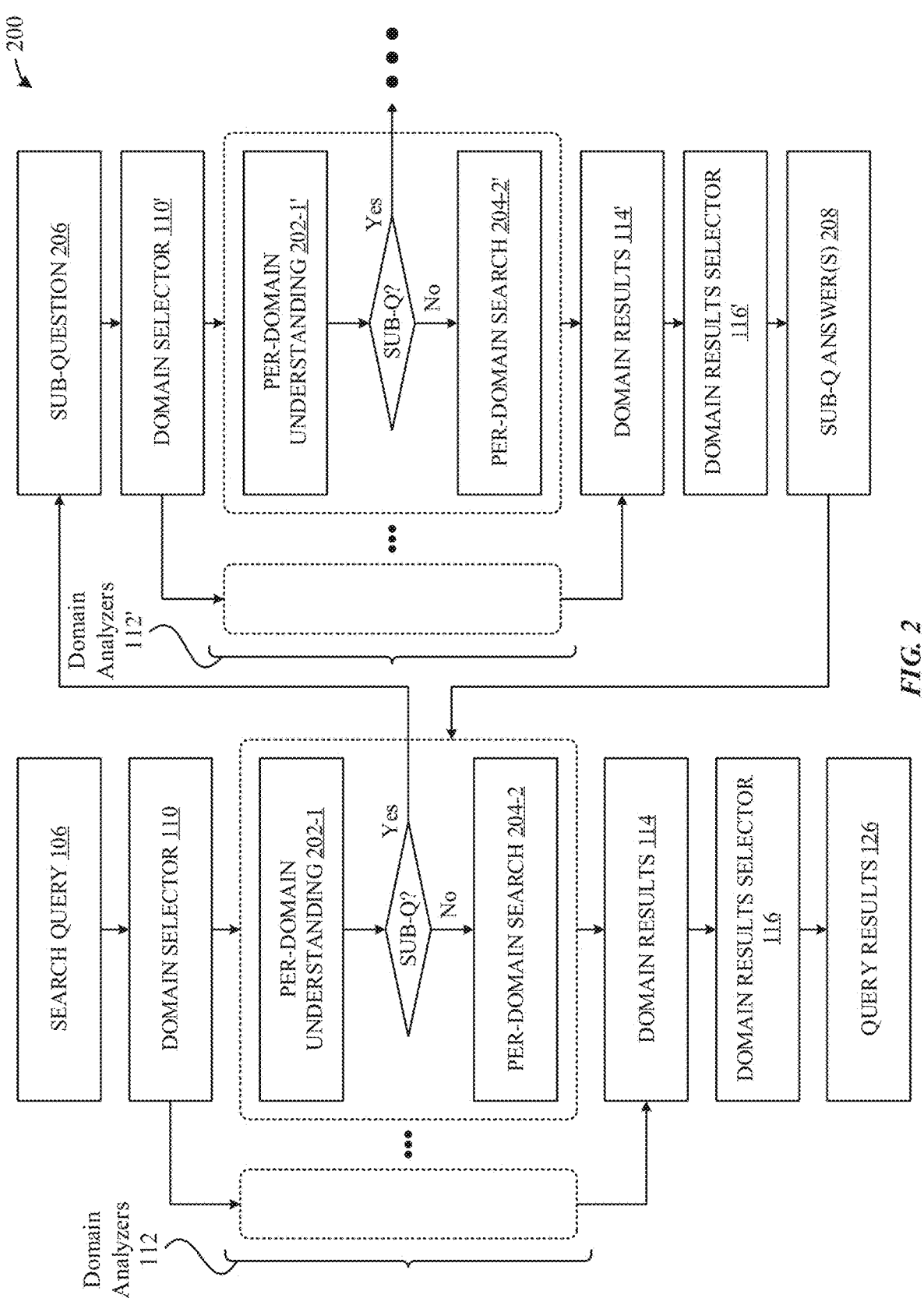
FIG. 2 illustrates a conceptual diagram of the query processing pipelines described above in conjunction with FIG. 1, according to some embodiments.

FIG. 2 illustrates a conceptual diagram 200 of the query processing pipelines described above in conjunction with FIG. 1G, according to some embodiments. In particular, and as shown in FIG. 2, a given domain analyzer 112 can include a per-domain understanding unit 202-1, and a per-domain search unit 204-2. According to some embodiments, the per-domain understanding unit 202-1 can perform search query 106 parsing functionalities, query planning functionalities, and the like. For example, the per-domain understanding unit 202-1 can be trained to receive search queries 106—typically in an "unstructured" or a "structured" form—and to output supplemental/corresponding queries in structured forms. According to some embodiments, the per-domain understanding unit 202-1 can be trained—commonly referred to as "fine-tuning"—to output the structured queries in accordance with particular styles, formats, domains, etc., so that the structured queries are well-suited for the other entities (discussed below) that receive and process the structured queries.

Additionally, and according to some embodiments, the per-domain understanding unit 202-1 can implement a query intelligence engine that can generate additional search content for the structured queries. Consider, for example, a scenario in which the per-domain understanding unit 202-1 receives a search query 106 with a request to "generate a playlist that includes songs for a warm winter cabin in the snow." Here, the per-domain understanding unit 202-1, when attempting to generate one or more structured queries (for the unstructured query), may only generate a single structured query—e.g., one that searches the Internet (and/or other informational source(s)) to identify "songs for a warm winter cabin in the snow"—which largely resembles the search query 106 that was originally received. Consequently, it can be beneficial for the structured query to be expanded prior to interfacing with the knowledge sources 118, as such an expansion likely will improve the overall accuracy, relevancy, etc., of the search results.

In this regard, and according to some embodiments, the per-domain understanding unit 202-1 can be configured to identify structured queries that have expansion potential, and process the structured queries for expansion. Continuing with the example scenario discussed above, expanding the structed query "songs for a warm winter cabin in the snow" can involve, for example, separating the terms "warm winter cabin" and "snow" to be analyzed individually. In turn, the per-domain understanding unit 202-1 can expand (e.g., using one or more AI models) the term "warm winter cabin" into music-specific categories and corresponding properties, for example, "Genres: Folk/Acoustic, Jazz, Classical, Chill-out/Ambient, Nature Sounds," and "Moods: Warm, Cozy." The per-domain understanding unit 202-1 can also expand (e.g., using one or more AI models) the term "snow" into, for example, "Genres: Classical, Holiday/Seasonal," "Comments: Snow, Wintertime, Mountains, Log Cabin." The per-domain understanding unit 202-1 can also generate (e.g., using one or more AI models) specific candidates based on the structured query, e.g., "Candidates: Artist-1, Artist-2, Artist-3," where each of the aforementioned artists are known to match at least some of the terms in the structured query.

As a brief aside, it is noted that the foregoing examples are not meant to be limiting, and that unstructured/structured queries can be analyzed, parsed, segmented, etc., at any level of granularity, without departing from the scope of this disclosure. It is also noted that the search query expansion examples are not meant to be limiting, and that they can be expanded into any number, type, form, of additional search content, at any level of granularity, without departing from the scope of this disclosure.

As described in greater detail herein, a given structured query can include all information that enables per-domain search units 204-2 (e.g., in conjunction with knowledge sources 118) to execute the structured query. Alternatively, a given structured query can include one or more placeholders to be assigned values that are obtained through invocations of additional query processing pipelines. Consider, for example, a search query 106 that includes the text "Route my car to the Red Sox game." In this example, the domain selector 110 can determine, based on (for example) the terms "route" and "car," that (at least) a domain analyzer 112 configured to implement mapping functionalities (hereinafter, the "mapping-centric domain analyzer 112") should process the search query 106 and provide domain results 114. Here, the mapping-centric domain analyzer 112 may be capable of generating route instructions to a specific location, but may not be capable of determining where the Red Sox game is being played at the time the search query 106 is received. In this regard, the per-domain understanding unit 202-1 can, for example, generate a structured query that reads {intent: "navigate", point_of_interest: "Where is the Red Sox game?"}, where the value for the point_of_interest parameter effectively constitutes a placeholder that must be filled in before the structured query can be processed by the per-domain search unit 204-2.

Accordingly, and as shown in FIG. 2, the domain analyzer 112 can implement a sub-question checkpoint that determines whether the structured query includes at least one sub-question to be answered (i.e., prior to providing the structured query to the per-domain search unit 204-2 for processing). In this regard, and continuing with the foregoing example, the mapping-centric domain analyzer 112 can provide the sub-question (illustrated in FIG. 2 as a sub-question 206) to an invocation of an additional query processing pipeline. As shown in FIG. 2, the sub-question 206 (i.e., "Where is the Red Sox game") can be processed by the domain selector 110', one or more domain analyzers 112', etc., that will attempt to answer the sub-question 206 (e.g., using approaches that are consistent with the techniques described herein). In this example, the domain selector 110 can determine, based on (for example) the terms "game" and "Red Sox," that (at least) a domain analyzer 112' configured to implement sports information functionalities (hereinafter, the "sports-centric domain analyzer 112") should process the sub-question 206 and provide domain results 114'. Here, the sports-centric domain analyzer 112 may be fully capable of answering the sub-question 206, or may identify additional sub-questions that need to be answered in order to effectively answer the sub-question 206.

When the sports-centric domain analyzer 112 is fully capable of answering the sub-question 206, then the sub-question 206 is provided to the per-domain search unit 204-2' for processing (in accordance with the techniques described below). Conversely, when the sports-centric domain analyzer 112 identifies additional sub-questions that need to be answered in order to effectively answer the sub-question 206, then one or more additional query processing pipelines can be invoked until all sub-questions have been answered (e.g., using approaches that are consistent with the techniques described herein). In turn, the last-invocated query processing pipeline can provide its answer(s) to its parent query processing pipeline, and so on, until answers for all sub-questions are assigned to placeholder values in a recursive fashion (e.g., using approaches that are consistent with the techniques described herein).

According to some embodiments, and as described herein, the per-domain search unit 204-2' can be configured to interface with the appropriate knowledge sources 118 to obtain results for the structured query. It is noted that a given per-domain search unit 204-2 can employ any number/type of AI models to effectively identify, for a given structured query, the appropriate knowledge source(s) 118 to which the structured query should be directed. Alternatively (or additionally), the per-domain understanding unit 202-1 (that provides structured queries to the aforementioned per-domain search unit 204-2) can assign, to one or more of the structured queries, the appropriate knowledge sources 118 to which the structured queries should be directed. In this manner, the aforementioned per-domain search unit 204-2 can reduce or eliminate the task of identifying knowledge sources 118 to which the structured queries should be directed, which can improve efficiency under certain configurations of the system 100.

In any case, and continuing with the foregoing example, the domain results 114' generated by the per-domain search unit 204-2' can be provided to the domain results selector 116', which then processes the domain results 114' consistent with the techniques described herein. The processed domain results 114'—e.g., "Fenway Park"—are then returned to the mapping-centric domain analyzer 112 as sub-question answers 208, which can then be incorporated into the placeholder value "Where is the Red Sox game"). In turn, the per-domain search unit 204-2 of the mapping-centric domain analyzer 112 can process the structured query (e.g., {intent: "navigate", point_of_interest: "Fenway Park"} to generate domain results 114, which are then utilized by the domain results selector 116 to generate query results 126 (e.g., route information from the current location of the client computing device 102 to the location of Fenway Park).

Figure 3B:
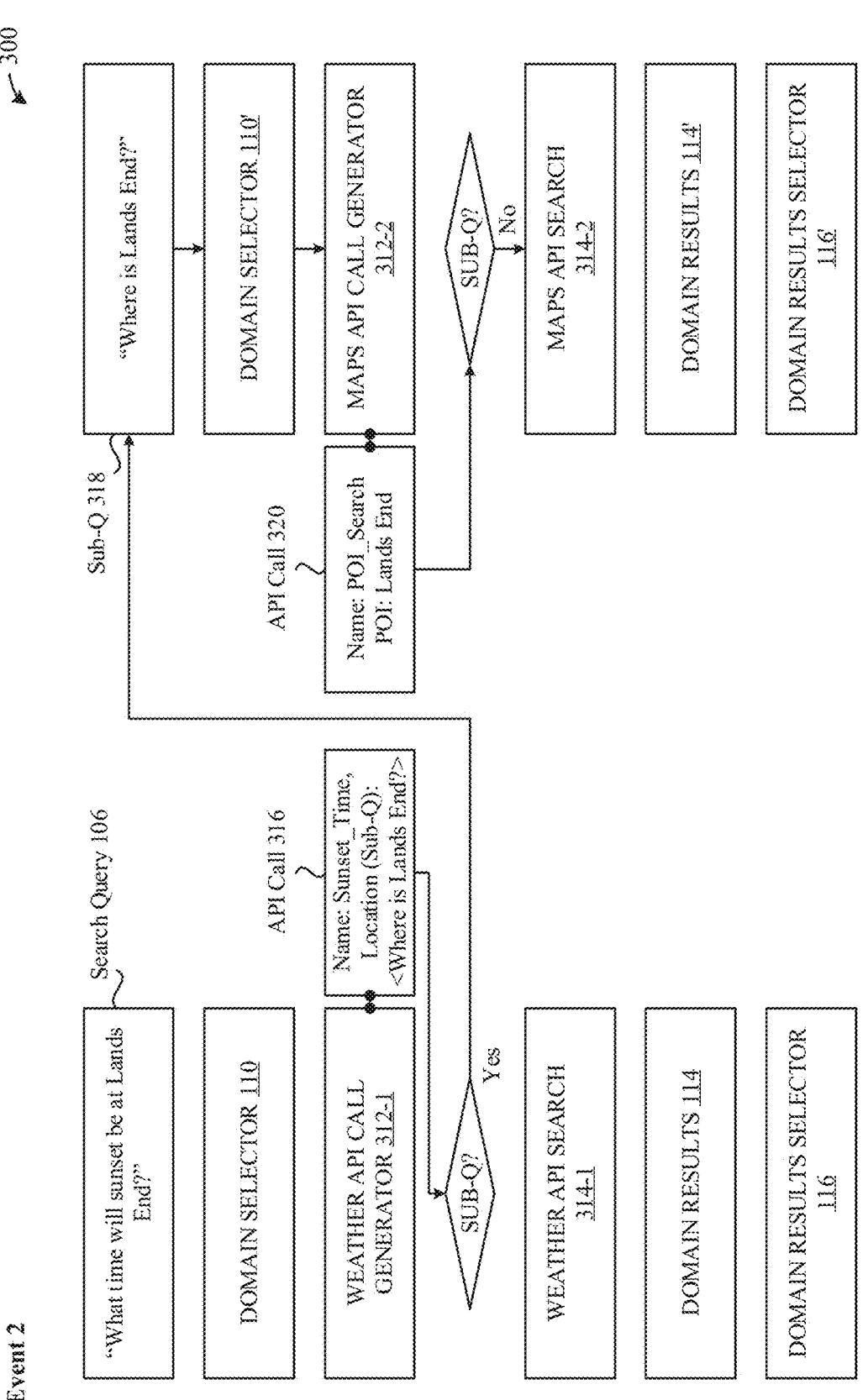

Accordingly, FIGS. 1-2 provide a breakdown of how the entities illustrated in FIG. 1G can implement the various techniques described herein. Additionally, FIGS. 3A-3E illustrate conceptual diagrams of how an example search query 106 can be processed, according to some embodiments. As shown in FIG. 3A, a first event involves a domain selector 110 (e.g., implemented within an invocation of a first query processing pipeline (i.e., the leftmost column of entities illustrated in FIGS. 3A-3E)) receiving a search query 106 that includes the text "What time will the sunset be at Lands End?". In response, the domain selector 110 processes the search query 106 and determines, based on (for example) the terms "sunset" and "time," that (at least) a domain analyzer 112 configured to implement weather, meteorological, etc., information functionalities (hereinafter, the "weather-centric domain analyzer 112") should process the search query 106. In turn, the weather-centric domain analyzer 112—which can implement a per-domain search unit (illustrated in FIG. 3A as a weather Application Programming Interface (API) call generator 312-1) and a per-domain understanding unit (illustrated in FIG. 3A as weather API search engine 314-1), consistent with the techniques described above in conjunction with FIG. 2—can begin processing the search query 106.

As shown in FIG. 3A, the weather API call generator 312-1 generates an API call 316 that takes the form "Name: Sunset_Time, Location (Sub-Q): <Where is Lands End?>". It is noted that the example format of the API call 316 is not meant to be limiting, and that the API call 316 can incorporate any amount, type, form, etc., of information, at any level of granularity, without departing from the scope of this disclosure. In any case, and as shown in FIG. 3A, the API call 316 includes a sub-question pertaining to the location of Lands End, given the weather-centric domain analyzer 112 is not (at least currently) designed to answer location-based questions. As described herein, this sub-question can be detected by a sub-question checkpoint implemented by the weather-centric domain analyzer 112, and can influence the manner in which the API call 316 is processed (the details of which are described below in conjunction with FIGS. 3B-3E).

As shown in FIG. 3B, a second event can involve the aforementioned sub-question checkpoint detecting that the API call 316 includes at least one sub-question. In response, a second query processing pipeline can be invoked (i.e., the rightmost column of entities illustrated in FIGS. 3B-3E), and the aforementioned sub-question can be provided to the second query processing pipeline in the form of a sub-question 318. The domain selector 110' (implemented within the second query processing pipeline) then processes the sub-question 318 and determines, based on (for example) the terms "where" and "Lands End," that (at least) a domain analyzer 112' configured to implement mapping functionalities (hereinafter, the "mapping-centric domain analyzer 112") should process the sub-question 318. In turn, the mapping-centric domain analyzer 112—which can implement a per-domain search unit (illustrated in FIG. 3B as a maps API call generator 312-2) and a per-domain understanding unit (illustrated in FIG. 3B as maps API search engine 314-2), consistent with the techniques described above in conjunction with FIG. 2—can begin processing the sub-question 318.

As shown in FIG. 3B, the maps API call generator 312-2 generates an API call 320 that takes the form "Name: POI_Search, POI: Lands End" (where "POI" stands for point of interest). Again, it is noted that the example format of the API call 320 is not meant to be limiting, and that the API call 320 can incorporate any amount, type, form, etc., of information, at any level of granularity, without departing from the scope of this disclosure. In any case, and as shown in FIG. 3B, the API call 320 does not include any sub-questions, particularly because the mapping-centric domain analyzer 112 is independently capable of generating an answer for the sub-question 318 (i.e., an answer that does not rely on answers to any nested sub-questions). Accordingly, under this example scenario, an invocation of a third query processing pipeline is not necessary, given the maps API search engine 314-2 is capable of looking up location information associated with Lands End (i.e., without assistance from other domain analyzers 112).

Figure 3C:
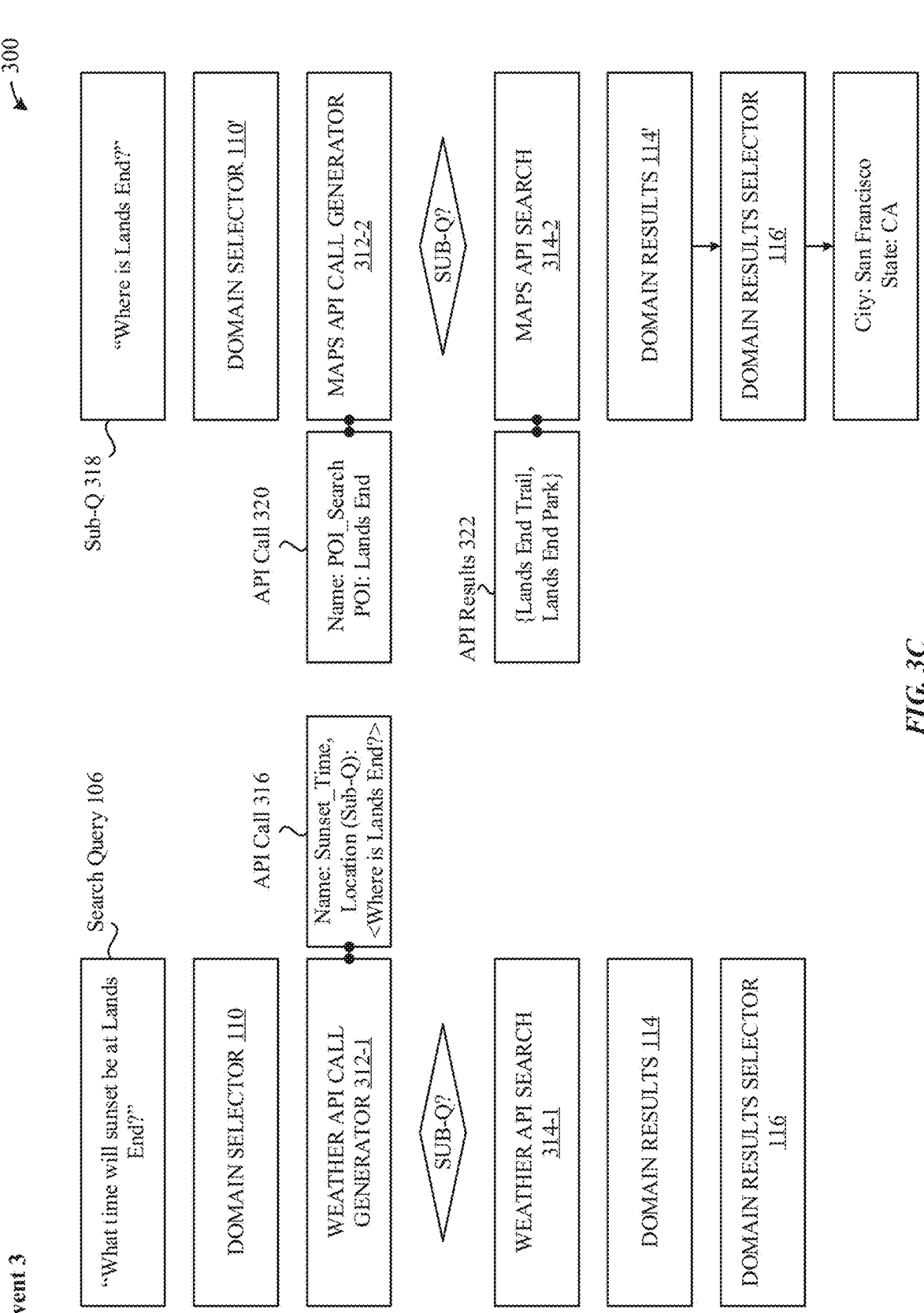

Accordingly, a third event illustrated in FIG. 3C involves the maps API search engine 314-2 generating API results 322 based on the API call 320. As shown in FIG. 3C, the API results 322 include the values "Lands End Trail" and "Lands End Park," which constitute POI information that was looked up by the maps API search engine 314-2 in conjunction with executing the API call 320. In turn, a fourth event illustrated in FIG. 3D involves providing the API results 322 (in the form of domain results 114') to the domain results selector 116' (implemented within the second query processing pipeline). In turn, the domain results selector 116' can process the domain results 114' provided by the maps API search engine 314-2 (consistent with the techniques described herein). Again, this step could also involve processing domain results 114' provided by other domain analyzers 112' (implemented within the second query processing pipeline), if any, that were selected by the domain selector 110' in response to receiving the sub-question 318 (which does not occur in the example scenario of FIGS. 3A-3E).

Figure 3D:
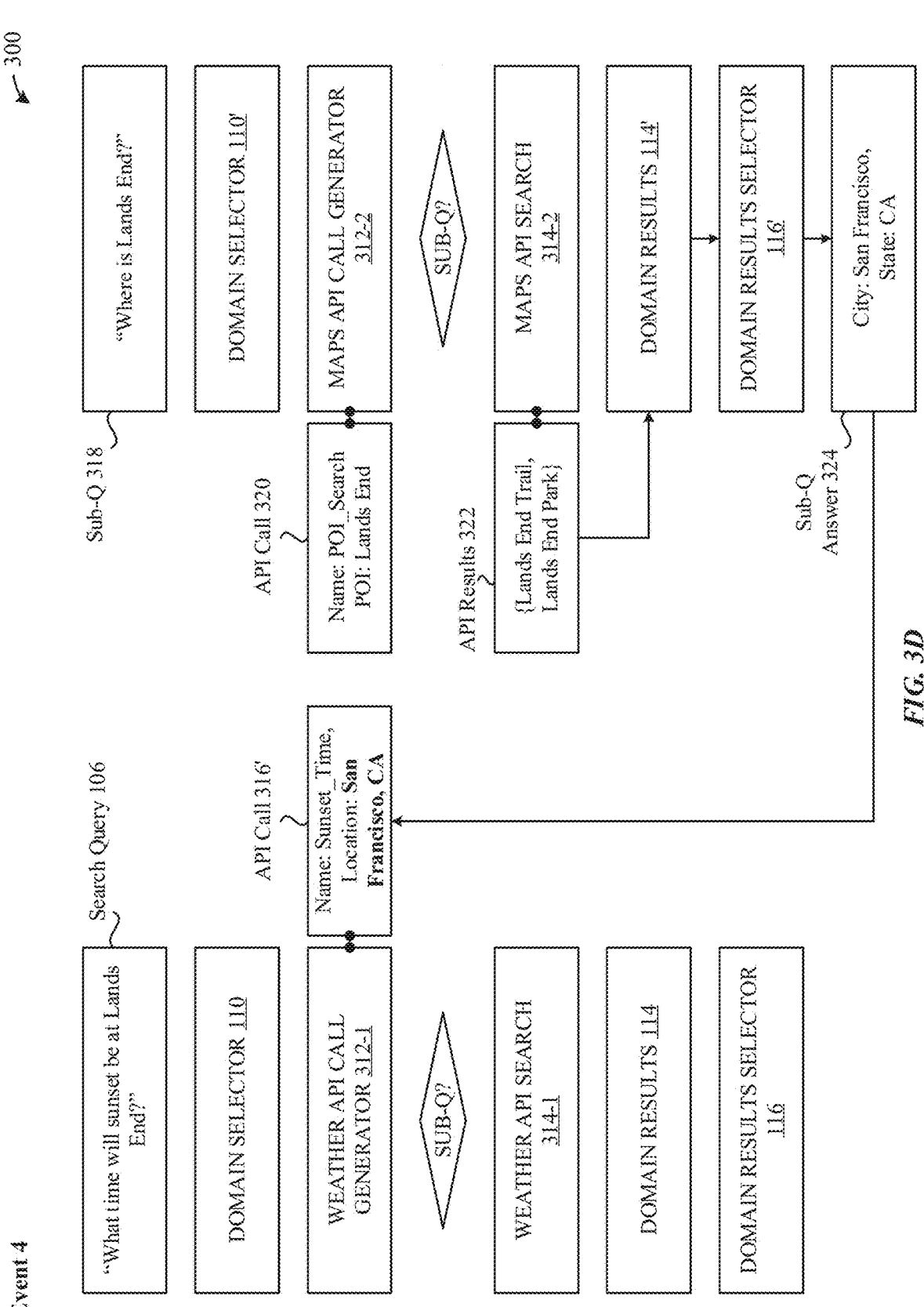
Figure 3E:
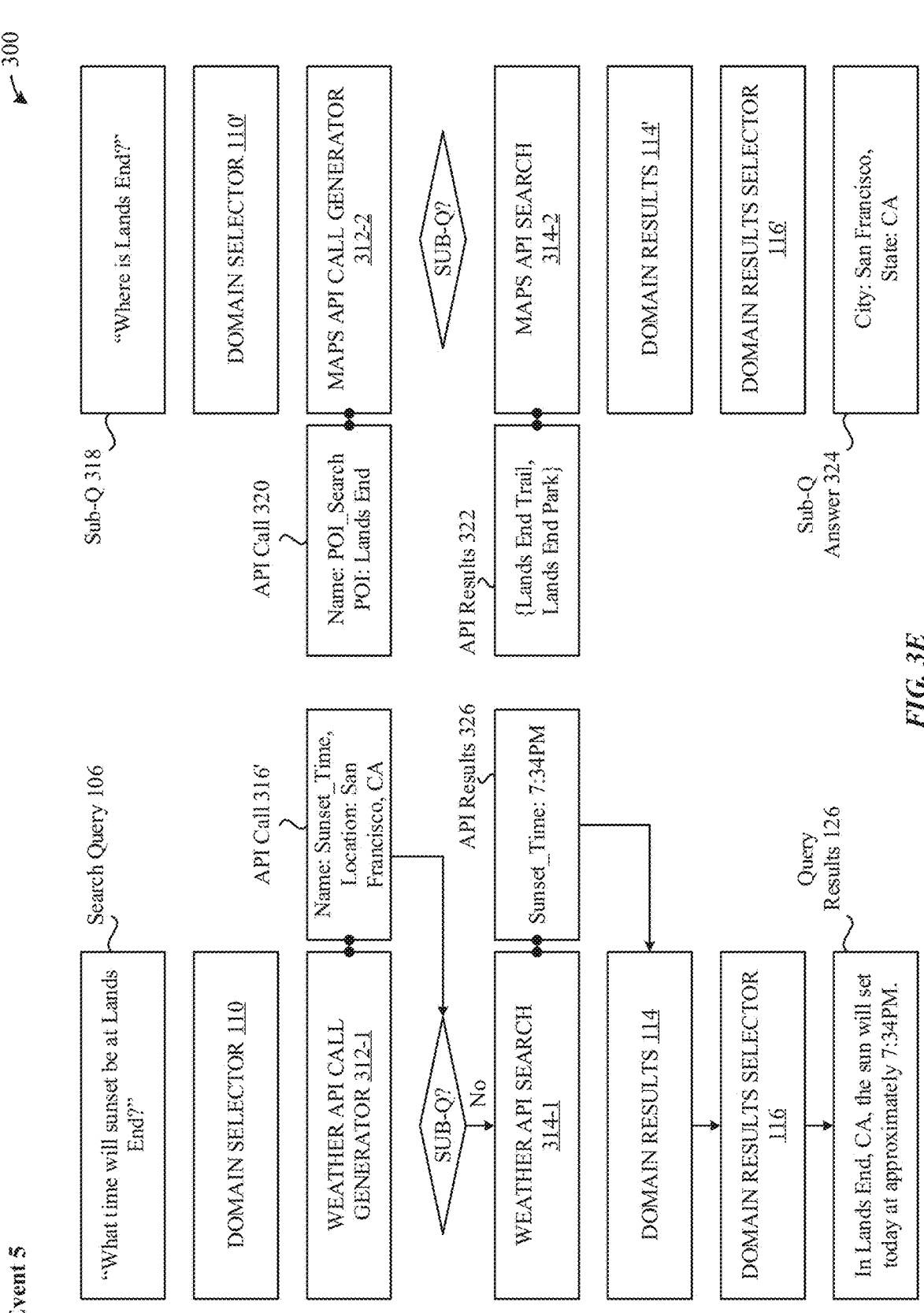

As shown in FIG. 3D, the domain results selector 116' generates a sub-question answer 324 that includes the information "City: San Francisco, State: CA". In turn, the domain results selector 116' provides the sub-question answer 324 to the weather API call generator 312-1 (implemented within the first query processing pipeline), and the information included in the sub-question answer 324 is injected into the placeholder value included in the API call 316 (thereby yielding the API call 316'). In turn, and as shown in FIG. 3E, a fifth event involves the API call 316' being provided to the weather API search engine 314-1 for processing (given no sub-questions remain within the API call 316'). The weather API search engine 314-1 then processes the API call 316' to generate API results 326—which, as shown in FIG. 3E, includes the information "Sunset_Time: 7:34 PM". In turn, the API results 326 are provided as domain results 114 to the domain results selector 116 for processing. Again, this step could also involve processing domain results 114 provided by other domain analyzers 112 (implemented within the first query processing pipeline), if any, that were selected by the domain selector 110 in response to receiving the search query 106 (which does not occur in the example scenario of FIGS. 3A-3E).

As shown in FIG. 3E, the domain selector 110 can (e.g., consistent with the techniques described herein) generate query results 126 that include the information "In Lands End, CA, the sun will set today at approximately 7:34 PM." The query results 126 can then be returned to the client computing device 102 that issued the search query 106. In turn, the client computing device 102 can display the query results 126 using the appropriate applications, user interfaces, etc., to enable a user of the client computing device 102 to interact with the query results 126.

Figure 4A:
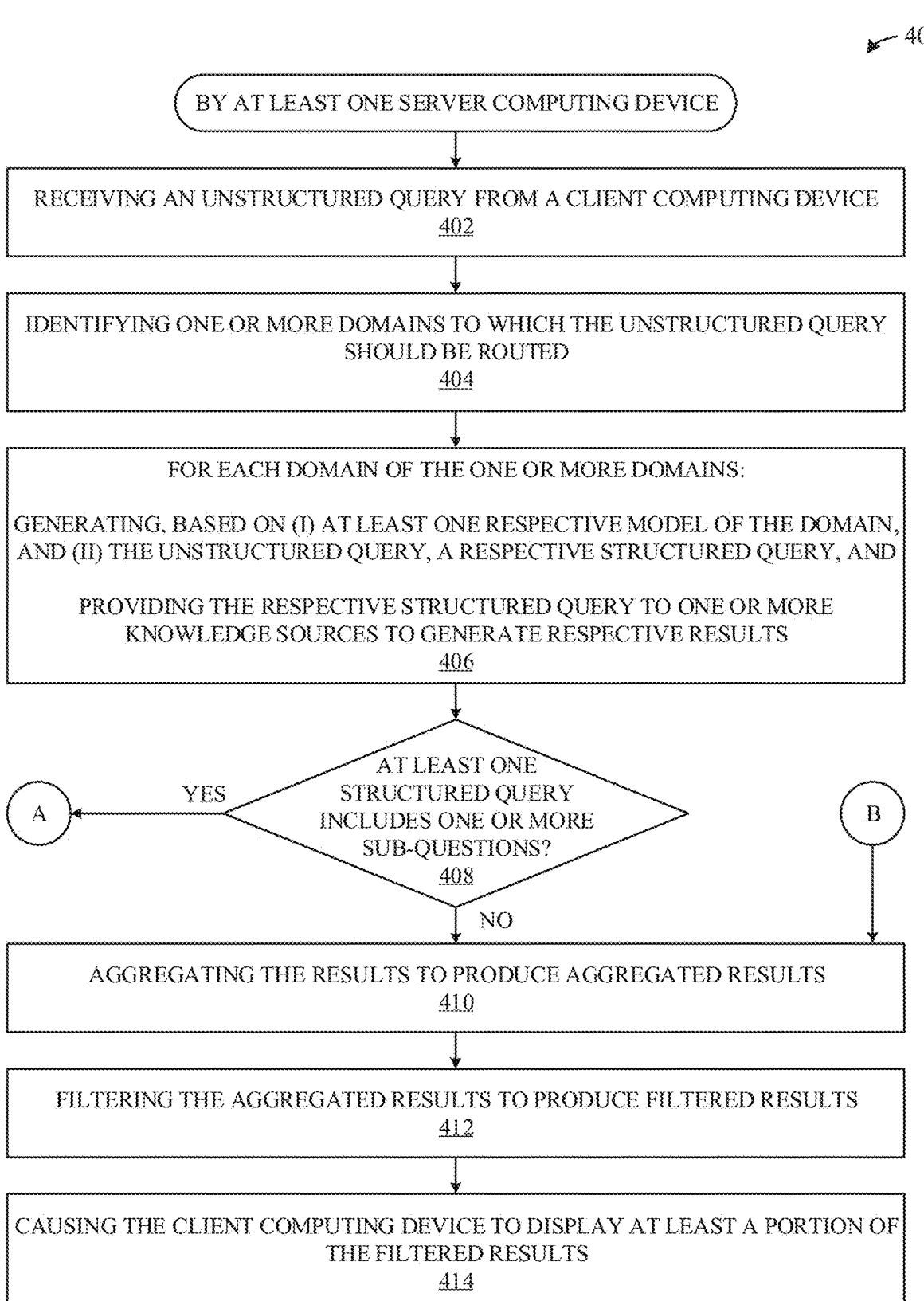
FIGS. 4A-4B illustrate a method for managing search queries that require interactions with multiple domains, according to some embodiments.
Figure 4B:
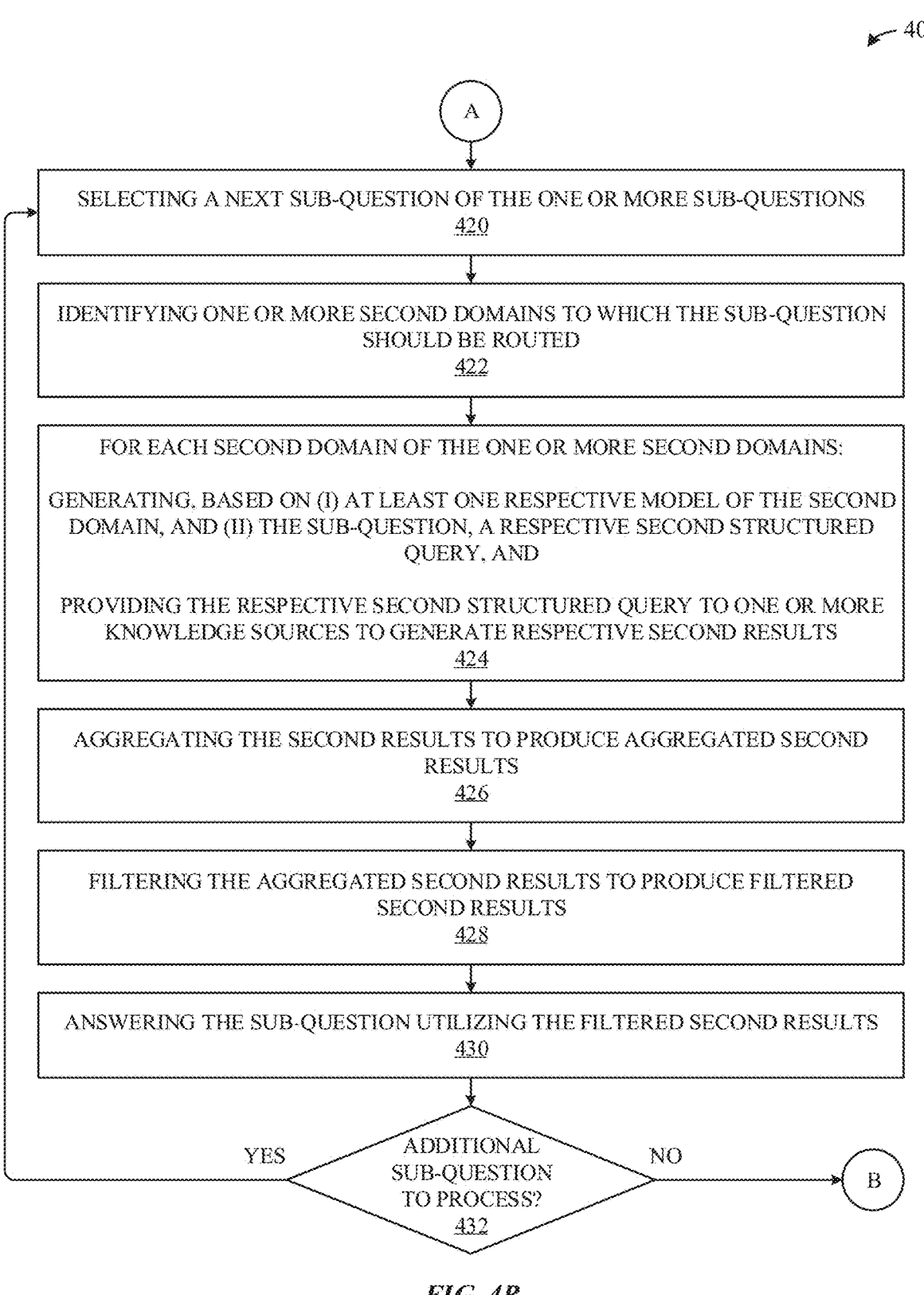

FIGS. 4A-4B illustrate a method 400 for managing search queries that require interactions with multiple domains, according to some embodiments. As shown in FIG. 4A, the method 400 begins at step 402, where the server computing device 108 receives an unstructured query from a client computing device (e.g., as described above in conjunction with FIGS. 1-2 and 3A-3E). At step 404, the server computing device 108 identifies one or more domains to which the unstructured query should be routed (e.g., as also described above in conjunction with FIGS. 1-2 and 3A-3E). At step 406, the server computing device 108 performs the following steps for each domain of the one or more domains: generating, based on (i) at least one respective model of the domain, and (ii) the unstructured query, a respective structured query, and providing the respective structured query to one or more knowledge sources to generate respective results (e.g., as described above in conjunction with FIGS. 1-2 and 3A-3E).

At step 408, the server computing device 108 determines whether at least one structured query includes one or more sub-questions (e.g., as described above in conjunction with FIGS. 1-2 and 3A-3E). If, at step 408, the server computing device 108 determines that at least one structured query includes one or more sub-questions, then the method 400 proceeds to step 409-1 of FIG. 4B (described below). Otherwise, the method 400 proceeds to step 410. At step 410, the server computing device 108 aggregates the results to produce aggregated results (e.g., as described above in conjunction with FIGS. 1-2 and 3A-3E). At step 412, the server computing device 108 filters the aggregated results to produce filtered results (e.g., as described above in conjunction with FIGS. 1-2 and 3A-3E). At step 414, the server computing device 108 causes the client computing device to display at least a portion of the filtered results (e.g., as described above in conjunction with FIGS. 1-2 and 3A-3E).

Turning now to FIG. 4B, at step 420, where the server computing device 102 selects a next sub-question of the one or more sub-questions (e.g., as described above in conjunction with FIGS. 1-2 and 3A-3E). At step 422, the server computing device 102 identifies one or more second domains to which the sub-question should be routed (e.g., as described above in conjunction with FIGS. 1-2 and 3A-3E). At step 424, the server computing device 102 performs the following steps for each second domain of the one or more second domains: generating, based on (i) at least one respective model of the second domain, and (ii) the sub-question, a respective second structured query, and providing the respective second structured query to one or more knowledge sources to generate respective second results (e.g., as described above in conjunction with FIGS. 1-2 and 3A-3E).

At step 426, the server computing device 102 aggregates the second results to produce aggregated second results (e.g., as described above in conjunction with FIGS. 1-2 and 3A-3E). At step 428, the server computing device 102 filters the aggregated second results to produce filtered second results (e.g., as described above in conjunction with FIGS. 1-2 and 3A-3E). At step 430, the server computing device 102 answers the sub-question utilizing the filtered second results (e.g., as described above in conjunction with FIGS. 1-2 and 3A-3E). At step 432, the server computing device 102 determines whether there are any additional sub-questions to process. If, at step 432, the server computing device 102 determines that there are additional sub-questions to process, then the method 400 proceeds back to step 420, where steps 420-432 are repeated until there are no additional sub-questions to process. Otherwise, the method 400 proceeds to step 410 of FIG. 4A, where steps 410-414 based on the techniques described above in conjunction with FIG. 4A.

In some embodiments, method 500 (illustrated in FIG. 5) is performed at a first computer system (as described herein) via a system process (e.g., an operating system process, a server system process, etc.) that is different from one or more applications executing and/or installed on the first computer system. In some embodiments, the method 500 performed at a first computer system (as described herein) by an application that is different from a system process. In some embodiments, the instructions of the application, when executed, control the first computer system to perform the method 500 by calling an application programming interface (API) provided by the system process. In some embodiments, the application performs at least a portion of the method 500 without calling the API.

In some embodiments, the application can be any suitable type of application, including, for example, one or more of:

a search application, a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first party application). In other embodiments, the application is an application that is provided to the first computer system via an operating system update file (e.g., a first party application). In other embodiments, the application is an application that is provided via an application store. In some implementations, the application store is pre-installed on the first computer system at purchase (e.g., a first party application store) and allows download of one or more applications. In some embodiments, the application store is a third party application store (e.g., an application store that is provided by another device, downloaded via a network, and/or read from a storage device). In some embodiments, the application is a third party application (e.g., an app that is provided by an application store, downloaded via a network, and/or read from a storage device). In some embodiments, the application controls the first computer system to perform the method 500 by calling an application programming interface (API) provided by the system process using one or more parameters.

In some embodiments, at least one API is a software module (e.g., a collection of computer-readable instructions) that provides an interface that allows a different set of instructions (e.g., API calling instructions) to access and use one or more functions, methods, procedures, data structures, classes, and/or other services provided by a set of implementation instructions of the system process. The API can define one or more parameters that are passed between the API calling instructions and the implementation instructions.

As described above, in some embodiments, the application controls the first computer system to perform the method 500 by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, a search API, and/or image processing API.

In some embodiments, the API 90 defines a first API call that can be provided by API calling instructions 80, where the definition for the first API call specifies the following call parameters: at least one unstructured query (e.g., text that is input by a user, text that is transcribed from a voice input provided by a user, text that is derived from information associated with a selection of one or more data objects, etc.).

In some embodiments, the API 90 defines a first API response that can be provided to the application by API calling instructions 80, where the first API call response includes filtered results that are associated with, correspond to, etc., the unstructured query.

In some embodiments, the set of implementation instructions is a system software module (e.g., a collection of computer-readable instructions) that is constructed to perform an operation in response to receiving an API call via the API. In some embodiments, the set of implementation instructions is constructed to provide an API response (via the API) as a result of processing an API call. In some embodiments, the set of implementation instructions is included in the device (e.g., 50) that runs the application. In some embodiments, the set of implementation instructions is included in an electronic device that is separate from the device that runs the application.

Turning now to FIG. 5, according to some embodiments, the method 500 can be performed by a media playback application, a search application, a weather application, a maps application, a clock application, etc.—referred to within the context of FIG. 5 as the "application"—executing on a client computing device 102. As shown in FIG. 5, the method 500 begins at step 502, where the application obtains an unstructured query from a user of the client computing device (e.g., as described above in conjunction with FIGS. 1, 2, 3A-3E, and 4A-4B).

At step 504, the application, in response to obtaining the unstructured query, provides the unstructured query to an operating system (OS) executing on the client computing device 102 (e.g., as described above in conjunction with FIGS. 1, 2, 3A-3E, and 4A-4B).

At step 506, the application, in response to providing the unstructured query to the OS, receives filtered results associated with the unstructured query, where: (1) one or more domains to which the unstructured query should be routed are identified (e.g., as described above in conjunction with FIGS. 1, 2, 3A-3E, and 4A-4B), (2) for each domain of the one or more domains: a respective structured query is generated based on (i) at least one respective model of the domain (e.g., as described above in conjunction with FIGS. 1, 2, 3A-3E, and 4A-4B), and (ii) the unstructured query, and the respective structured query is provided to one or more knowledge sources to generate respective results, and (3) the results are aggregated and filtered to generate the filtered results (e.g., as described above in conjunction with FIGS. 1, 2, 3A-3E, and 4A-4B).

At step 508, the application, in response to receiving the filtered results, performs at least one action associated with the filtered results (e.g., as described above in conjunction with FIGS. 1, 2, 3A-3E, and 4A-4B).

Figure 6:
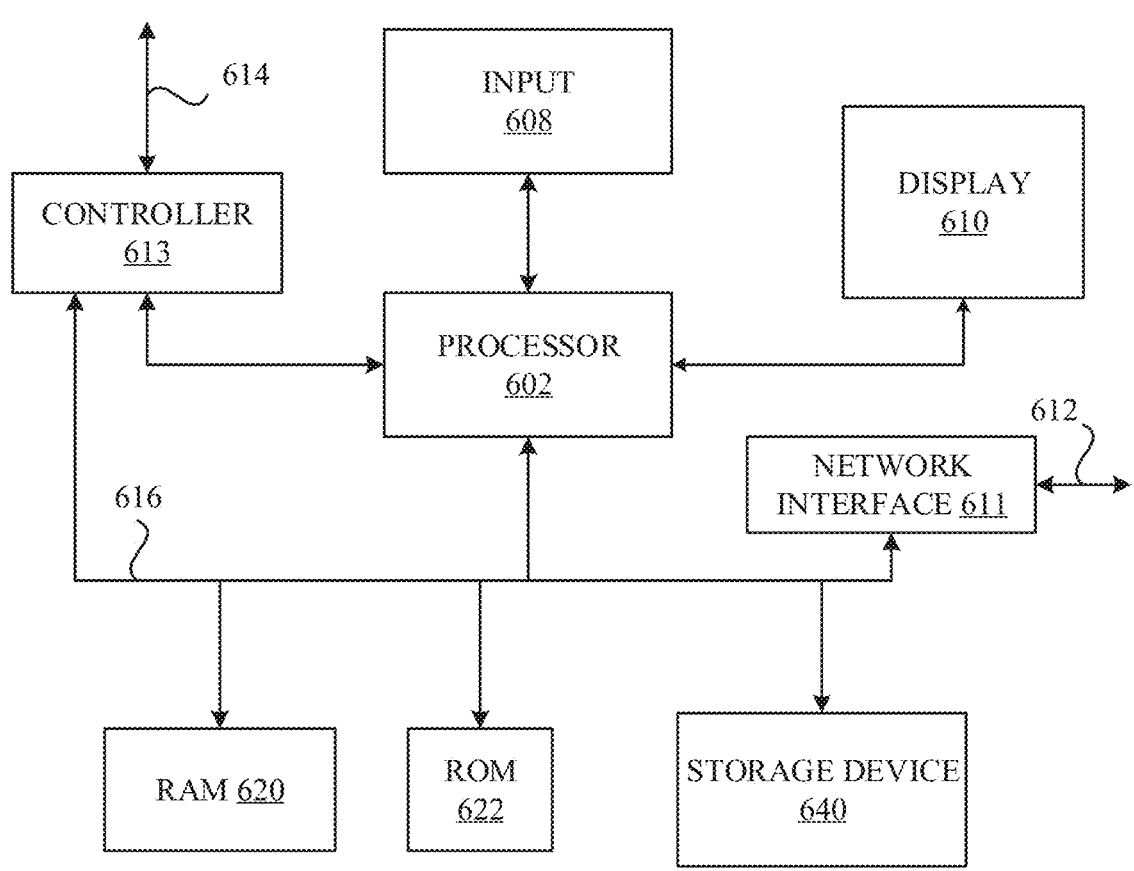
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the client computing device 102, the server computing device 108, the knowledge sources 118, and so on, described above in conjunction with FIG. 1.

As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Furthermore, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., SSDs), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities, or processes to be executed in a non-volatile manner. The RAM 620 can provide volatile data storage, and stores instructions related to the operation of the computing devices described herein.

The various aspects, embodiments, implementations, or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

As described herein, one aspect of the present technology is the gathering and use of data available from various sources to improve user experiences. The present disclosure contemplates that in some instances, this gathered data may include personal information data that uniquely identifies or can be used to contact or locate a specific person. Such personal information data can include demographics data, location-based data, telephone numbers, email addresses, home addresses, data or records relating to a user's health or level of fitness (e.g., vital signs measurements, medication information, exercise information), date of birth, smart home activity, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select to provide only certain types of data that contribute to the techniques described herein. In addition to providing "opt in" and "opt out" options, the present disclosure contemplates providing notifications relating to the access or use of personal information. For instance, a user may be notified that their personal information data may be accessed and then reminded again just before personal information data is accessed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other implementations, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some implementations, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

What is claimed is:

1. A method, comprising, by at least one server computing device: receiving an unstructured query from a client computing device;

identifying a plurality of domains to which the unstructured query should be routed, wherein the plurality of domains includes a first domain and a second domain different from the first domain;

sending, to a first knowledge source corresponding to the first domain, a first structured query, wherein the first structured query is based on the unstructured query;

receiving, from the first knowledge source corresponding to the first domain, a first response;

generating, based on (i) the first response and (ii) the unstructured query, a second structured query different from the first structured query;

sending, to a second knowledge source corresponding to the second domain, the second structured query, wherein the second knowledge source is different from the first knowledge source;

receiving, from the second knowledge source corresponding to the second domain, results;

filtering the results to produce filtered results; and causing the client computing device to display at least a portion of the filtered results.

2. The method of claim 1, further comprising:

prior to identifying the plurality of domains to which the unstructured query should be routed, providing the unstructured query to at least one model that indicates whether the unstructured query should be processed using model-based approaches or rule-based approaches, wherein the at least one model indicates that the unstructured query should be processed using model-based approaches.

3. The method of claim 1, wherein identifying the plurality of domains to which the unstructured query should be routed includes providing the unstructured query to at least one model that outputs identifying information for the plurality of domains.

4. The method of claim 1, wherein the first structured query is generated independently from the second structured query.

5. The method of claim 1, wherein the first knowledge source includes:

at least one web search engine;

at least one question and answer (Q&A) knowledge source;

at least one knowledge graph;

at least one approximate nearest-neighbor (ANN) index;

at least one other LLM; or some combination thereof.

6. The method of claim 1, wherein the first structured query includes one or more sub-questions that require respective answers to be obtained prior to generating the respective results for the first structured query, the method further comprises:

for each sub-question of the one or more sub-questions:

identifying a plurality of sub-domains to which the sub-question should be routed;

for each sub-domain of the plurality of sub-domains:

generating, based on (i) a knowledge source corresponding to a sub-domain of the plurality of sub-domains and (ii) the sub-question, a third structured query, and providing the third structured query to the knowledge source corresponding to the sub-domain of the plurality of sub-domains to generate sub-results;

aggregating the sub-results to produce aggregated sub-results;

filtering the aggregated sub-results to produce filtered sub-results; and answering the sub-question utilizing the filtered sub-results.

7. The method of claim 6, wherein the second structured query does not include any sub-questions.

8. The method of claim 6, wherein utilizing the filtered sub-results to answer a given sub-question includes utilizing at least one model to generate, based on the filtered sub-results, an output that supplants the sub-question and that is compatible with the domain associated with the first structured query.

9. The method of claim 6, wherein filtering the results to produce the filtered results includes providing (i) the unstructured query, and (ii) at least a portion of the filtered results, to at least one model to produce the filtered results, and wherein filtering the aggregated sub-results to produce the filtered sub-results includes providing (i) the first structured query, and (ii) at least a portion of the filtered sub-results, to at least one model to produce the filtered sub-results.

10. The method of claim 1, wherein the unstructured query is paired with at least one conversation history that is associated and received from the client computing device, and wherein the at least one conversation history influences a manner in which (i) the first knowledge source corresponding to the first domain generates the first response, (ii) the second knowledge source corresponding to the second domain generates the results, or some combination thereof.

11. A non-transitory computer readable storage medium configured to store instructions that, when executed by at least one processor included in a server computing device, cause the server computing device to carry out steps that include:

receiving an unstructured query from a client computing device;

identifying a plurality of domains to which the unstructured query should be routed, wherein the plurality of domains includes a first domain and a second domain different from the first domain;

sending, to a first knowledge source corresponding to the first domain, a first structured query, wherein the first structured query is based on the unstructured query:

receiving, from the first knowledge source corresponding to the first domain, a first response;

generating, based on (i) the first response and (ii) the unstructured query, a second structured query different from the first structured query;

sending, to a second knowledge source corresponding to the second domain, the second structured query, wherein the second knowledge source is different from the first knowledge source;

filtering the results to produce filtered results; and causing the client computing device to display at least a portion of the filtered results.

12. The non-transitory computer readable storage medium of claim 11, wherein the steps further include, prior to identifying the plurality of domains to which the unstructured query should be routed, providing the unstructured query to at least one model that indicates whether the unstructured query should be processed using model-based approaches or rule-based approaches, and wherein the at least one model indicates that the unstructured query should be processed using model-based approaches.

13. The non-transitory computer readable storage medium of claim 11, wherein identifying the plurality of domains to which the unstructured query should be routed includes providing the unstructured query to at least one model that outputs identifying information for the plurality of domains.

14. The non-transitory computer readable storage medium of claim 11, wherein the first structured query is generated independently from the second structured query.

15. A server computing device, comprising:
at least one processor; and
at least one memory storing instructions that, when executed by the at least one processor, cause the server computing device to carry out steps that include:
receiving an unstructured query from a client computing device;
identifying a plurality of domains to which the unstructured query should be routed, wherein the plurality of domains includes a first domain and a second domain different from the first domain;
sending, to a first knowledge source corresponding to the first domain, a first structured query, wherein the first structured query is based on the unstructured query;
receiving, from the first knowledge source corresponding to the first domain, a first response;
generating, based on (i) the first response and (ii) the unstructured query, a second structured query different from the first structured query;
sending, to a second knowledge source corresponding to the second domain, the second structured query, wherein the second knowledge source is different from the first knowledge source;
receiving, from the second knowledge source corresponding to the second domain, results;
filtering the results to produce filtered results; and
causing the client computing device to display at least a portion of the filtered results.

16. The server computing device of claim 15, wherein the steps further include, prior to identifying the plurality of domains to which the unstructured query should be routed, providing the unstructured query to at least one model that indicates whether the unstructured query should be processed using model-based approaches or rule-based approaches, and wherein the at least one model indicates that the unstructured query should be processed using model-based approaches.

17. The server computing device of claim 15, wherein identifying the plurality of domains to which the unstructured query should be routed includes providing the unstructured query to at least one model that outputs identifying information for plurality of domains.

18. The server computing device of claim 15, wherein the first structured query is generated independently from the second structured query.

19. A method, comprising, by an application executing on a client computing device:
obtaining an unstructured query from a user of the client computing device;
in response to obtaining the unstructured query, providing the unstructured query to an operating system (OS) executing on the client computing device;
in response to providing the unstructured query to the OS, receiving filtered results associated with the unstructured query, wherein:
(1) a plurality of domains to which the unstructured query should be routed are identified, wherein the plurality of domains includes a first domain and a second domain different from the first domain,
(2) a first structured query that is based on the unstructured query is sent to a first knowledge source corresponding to the first domain,
(3) a first response is received from the first knowledge source corresponding to the first domain,
(4) a structured query different from the first structured query is generated based on (i) the first response and (ii) the unstructured query, and
(5) the structured query is sent to a second knowledge source corresponding to the second domain, wherein the second knowledge source is different from the first knowledge source,
(6) results are received from the second knowledge source corresponding to the second domain,
(7) the results are filtered to generate the filtered results; and
in response to receiving the filtered results, performing at least one action associated with the filtered results.

20. The method of claim 19, wherein the at least one action comprises displaying at least one user interface that includes at least one affordance associated with at least one result included in the filtered results.

\* \* \* \* \*